United States Patent
Håkansson et al.

(10) Patent No.: US 11,913,226 B2
(45) Date of Patent: Feb. 27, 2024

(54) METHOD TO PRODUCE A WEAR RESISTANT LAYER WITH DIFFERENT GLOSS LEVELS

(71) Applicant: Välinge Innovation AB, Viken (SE)

(72) Inventors: Niclas Håkansson, Viken (SE); Göran Ziegler, Viken (SE); Christer Lundblad, Orkelljunga (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 14/994,593

(22) Filed: Jan. 13, 2016

(65) Prior Publication Data

US 2016/0201324 A1 Jul. 14, 2016

(30) Foreign Application Priority Data

Jan. 14, 2015 (SE) .................................... 1550023-4

(51) Int. Cl.
*B29C 59/04* (2006.01)
*E04C 2/24* (2006.01)
*B29B 11/04* (2006.01)
B29C 59/02 (2006.01)
B29K 75/00 (2006.01)
(Continued)

(52) U.S. Cl.
CPC ................ *E04C 2/24* (2013.01); *B29B 11/04* (2013.01); *B29C 37/0067* (2013.01); *B29C 48/002* (2019.02); *B29C 48/07* (2019.02); *B29C 48/175* (2019.02); *B29C 48/21* (2019.02); *B29C 59/046* (2013.01); *B29C 2059/027* (2013.01); *B29K 2075/00* (2013.01); *B29K 2105/256* (2013.01); *B29L 2009/00* (2013.01); *B29L 2031/10* (2013.01); *B29L 2031/722* (2013.01)

(58) Field of Classification Search
CPC . B29C 59/02; B29C 59/026; B29C 2059/027; B29C 59/022; B44B 5/00; B44B 5/0019
See application file for complete search history.

(56) References Cited

U.S. PATENT DOCUMENTS 2,861,372 A * 11/1958 Hunt .................. B29C 59/02
101/32
3,135,643 A 6/1964 Michl
(Continued)

FOREIGN PATENT DOCUMENTS

CA 2 406 991 A1 11/2001
CN 104177817 A1 12/2014
(Continued)

OTHER PUBLICATIONS

International Search Report and Written Opinion issued in PCT/SE2016/050012, dated Feb. 22, 2016, ISA/SE Patent-och registreringsverket, Stockholm, SE, 13 pages.
(Continued)

*Primary Examiner* — Andrew D Graham
(74) *Attorney, Agent, or Firm* — Boone IP Law

(57) ABSTRACT

The present disclosure relates to a method to produce a wear resistant layer (1) and a method to produce a building panel (10) including a wear resistant layer (1). The wear resistant layer (1) includes a thermoplastic material. The wear resistant layer (1) is provided with portions (5, 6) having different gloss levels. The disclosure also relates to such a building panel (10).

30 Claims, 3 Drawing Sheets

(51) Int. Cl.
  *B29K 105/00* (2006.01)
  *B29L 31/00* (2006.01)
  *B29L 31/10* (2006.01)
  *B29L 9/00* (2006.01)
  *B29C 37/00* (2006.01)
  *B29C 48/17* (2019.01)
  *B29C 48/21* (2019.01)
  *B29C 48/07* (2019.01)
  *B29C 48/00* (2019.01)

(56) References Cited

U.S. PATENT DOCUMENTS

| | | | |
|---|---|---|---|
| 3,286,006 A | 11/1966 | Annand | |
| 3,308,013 A | 3/1967 | Bryant | |
| 3,887,678 A * | 6/1975 | Lewicki, Jr. | B29C 44/26 101/32 |
| 4,092,198 A * | 5/1978 | Scher | B29C 59/046 156/222 |
| 4,093,766 A | 6/1978 | Scher | |
| 4,255,480 A | 3/1981 | Scher | |
| 4,256,793 A * | 3/1981 | Cannady, Jr. | B29C 59/02 428/137 |
| 4,376,147 A * | 3/1983 | Byrne | A61F 13/51476 428/167 |
| 4,430,375 A | 2/1984 | Scher | |
| 4,450,194 A | 5/1984 | Kauffman et al. | |
| 4,615,090 A * | 10/1986 | Baus | B29C 33/42 101/7 |
| 4,756,856 A | 7/1988 | Choinski | |
| 4,916,007 A * | 4/1990 | Manning | B44F 1/08 428/203 |
| 5,112,671 A * | 5/1992 | Diamond | B32B 27/30 428/156 |
| 5,188,876 A * | 2/1993 | Hensel | E04F 15/02 428/698 |
| 5,266,384 A | 11/1993 | O'Dell | |
| 5,466,511 A | 11/1995 | O'Dell et al. | |
| 5,543,193 A | 8/1996 | Tesch | |
| 5,547,741 A | 8/1996 | Wilson | |
| 5,604,025 A * | 2/1997 | Tesch | B27N 3/06 442/394 |
| 5,662,977 A * | 9/1997 | Spain | B29C 37/0025 428/141 |
| 5,670,237 A | 9/1997 | Shultz et al. | |
| 5,766,522 A | 6/1998 | Daly et al. | |
| 5,787,655 A | 8/1998 | Saylor, Jr. | |
| 5,855,832 A | 1/1999 | Clausi | |
| 6,013,222 A | 1/2000 | Douglas et al. | |
| 6,103,377 A | 8/2000 | Clausi | |
| 6,218,001 B1 | 4/2001 | Chen | |
| 6,423,167 B1 | 7/2002 | Palmer et al. | |
| 6,444,075 B1 | 9/2002 | Schneider et al. | |
| 6,468,645 B1 | 10/2002 | Clausi | |
| 6,579,610 B1 | 6/2003 | Shortland | |
| 6,617,009 B1 | 9/2003 | Chen et al. | |
| 6,666,951 B1 | 12/2003 | Kostiw | |
| 6,675,545 B2 | 1/2004 | Chen et al. | |
| 6,761,008 B2 | 7/2004 | Chen et al. | |
| 6,803,110 B2 | 10/2004 | Drees et al. | |
| 6,926,954 B2 | 8/2005 | Schuren et al. | |
| 6,986,934 B2 | 1/2006 | Chen et al. | |
| 7,169,460 B1 | 1/2007 | Chen et al. | |
| 7,211,310 B2 | 5/2007 | Chen et al. | |
| 7,276,265 B2 | 10/2007 | Sigel et al. | |
| 7,419,717 B2 | 9/2008 | Chen et al. | |
| 7,568,322 B2 | 8/2009 | Pervan et al. | |
| 7,576,140 B2 | 8/2009 | Tamaki et al. | |
| 7,584,583 B2 | 9/2009 | Bergelin et al. | |
| 7,763,345 B2 | 7/2010 | Chen et al. | |
| 7,802,415 B2 | 9/2010 | Pervan | |
| 7,816,000 B2 | 10/2010 | Sparks et al. | |
| 7,886,497 B2 | 2/2011 | Pervan et al. | |
| 7,930,862 B2 | 4/2011 | Bergelin et al. | |
| 8,021,741 B2 | 9/2011 | Chen et al. | |
| 8,028,486 B2 | 10/2011 | Pervan | |
| 8,043,661 B2 | 10/2011 | Linnemann | |
| 8,112,891 B2 | 2/2012 | Pervan | |
| 8,245,478 B2 | 8/2012 | Bergelin et al. | |
| 8,293,058 B2 | 10/2012 | Pervan et al. | |
| 8,365,499 B2 | 2/2013 | Nilsson et al. | |
| 8,480,841 B2 | 7/2013 | Pervan et al. | |
| 8,511,031 B2 | 8/2013 | Bergelin et al. | |
| 8,584,423 B2 | 11/2013 | Pervan et al. | |
| 8,613,826 B2 | 12/2013 | Pervan et al. | |
| 8,658,274 B2 | 2/2014 | Chen et al. | |
| 8,756,899 B2 | 6/2014 | Nilsson et al. | |
| 8,800,150 B2 | 8/2014 | Pervan | |
| 8,833,028 B2 | 9/2014 | Whispell et al. | |
| 8,834,992 B2 | 9/2014 | Chen et al. | |
| 8,973,270 B2 | 3/2015 | Siebert et al. | |
| 9,194,133 B2 * | 11/2015 | Thiers | B44C 5/04 |
| 9,200,460 B2 * | 12/2015 | Cappelle | E04F 15/02 |
| 9,222,267 B2 | 12/2015 | Bergelin et al. | |
| 9,249,581 B2 | 2/2016 | Nilsson et al. | |
| 9,296,191 B2 | 3/2016 | Pervan et al. | |
| 9,314,936 B2 | 4/2016 | Pervan | |
| 9,410,328 B2 | 8/2016 | Pervan | |
| 9,670,371 B2 * | 6/2017 | Pervan | C09D 11/02 |
| 9,695,601 B2 | 7/2017 | Whispell et al. | |
| 9,714,515 B2 | 7/2017 | Pervan | |
| 9,765,530 B2 | 9/2017 | Bergelin et al. | |
| 10,047,527 B2 | 8/2018 | Nilsson et al. | |
| 10,059,084 B2 | 8/2018 | Lundblad et al. | |
| 10,137,659 B2 | 11/2018 | Pervan | |
| 10,287,777 B2 | 5/2019 | Boo et al. | |
| 10,301,830 B2 | 5/2019 | Boo | |
| 10,316,526 B2 | 6/2019 | Kell | |
| 10,344,379 B2 | 7/2019 | Pervan et al. | |
| 10,407,919 B2 | 9/2019 | Boo | |
| 10,450,760 B2 | 10/2019 | Bergelin et al. | |
| 10,486,399 B2 | 11/2019 | Chen et al. | |
| 10,493,731 B2 | 12/2019 | Lundblad et al. | |
| 10,526,793 B2 | 1/2020 | Nilsson et al. | |
| 10,704,269 B2 | 7/2020 | Whispell et al. | |
| 10,780,676 B2 | 9/2020 | Lundblad et al. | |
| 10,808,410 B2 | 10/2020 | Boo et al. | |
| 10,837,181 B2 | 11/2020 | Josefsson et al. | |
| 10,844,612 B2 | 11/2020 | Boo | |
| 10,851,549 B2 | 12/2020 | Boo | |
| 10,865,571 B2 | 12/2020 | Kell | |
| 10,975,580 B2 | 4/2021 | Pervan et al. | |
| 10,982,449 B2 | 4/2021 | Kell | |
| 11,066,836 B2 | 7/2021 | Bergelin et al. | |
| 11,306,486 B2 | 4/2022 | Nilsson et al. | |
| 11,359,387 B2 | 6/2022 | Whispell et al. | |
| 2001/0021431 A1 | 9/2001 | Chen | |
| 2002/0031646 A1 | 3/2002 | Chen | |
| 2002/0142135 A1 | 10/2002 | Chen et al. | |
| 2002/0146568 A1 * | 10/2002 | Ho | B32B 27/40 428/423.3 |
| 2003/0024199 A1 | 2/2003 | Pervan | |
| 2003/0055145 A1 | 3/2003 | Safta et al. | |
| 2003/0059639 A1 | 3/2003 | Worsley | |
| 2003/0072919 A1 * | 4/2003 | Watts, Jr. | B32B 3/00 428/203 |
| 2004/0048044 A1 | 3/2004 | Schneider | |
| 2004/0206036 A1 | 10/2004 | Pervan | |
| 2004/0241416 A1 * | 12/2004 | Tian | B05D 5/06 428/304.4 |
| 2005/0003160 A1 | 1/2005 | Chen et al. | |
| 2005/0107006 A1 * | 5/2005 | Makino | B24C 1/003 451/40 |
| 2005/0210810 A1 | 9/2005 | Pervan | |
| 2006/0130421 A1 * | 6/2006 | Nollet | B44F 9/02 52/582.1 |
| 2006/0191861 A1 * | 8/2006 | Mitterhofer | B44B 5/026 216/2 |
| 2007/0175148 A1 | 8/2007 | Bergelin et al. | |
| 2007/0196624 A1 | 8/2007 | Chen et al. | |
| 2008/0000183 A1 | 1/2008 | Bergelin et al. | |
| 2008/0000188 A1 | 1/2008 | Pervan | |

(56) References Cited

U.S. PATENT DOCUMENTS

| | | | |
|---|---|---|---|
| 2008/0010924 A1* | 1/2008 | Pietruczynik | B29C 59/04 52/309.1 |
| 2008/0032120 A1* | 2/2008 | Braun | B05D 7/06 428/334 |
| 2008/0063844 A1 | 3/2008 | Chen et al. | |
| 2008/0075882 A1* | 3/2008 | Hayata | B29C 59/02 427/542 |
| 2008/0172971 A1 | 7/2008 | Pervan | |
| 2008/0256890 A1 | 10/2008 | Pervan | |
| 2008/0311355 A1 | 12/2008 | Chen et al. | |
| 2009/0078129 A1* | 3/2009 | Cappelle | B44B 5/026 100/35 |
| 2009/0120731 A1* | 5/2009 | Thompson | B29C 47/0021 187/401 |
| 2009/0151866 A1* | 6/2009 | Endert | B32B 38/06 156/277 |
| 2009/0155612 A1* | 6/2009 | Pervan | B32B 21/02 428/498 |
| 2009/0208646 A1 | 8/2009 | Kreuder et al. | |
| 2010/0092731 A1* | 4/2010 | Pervan | E04C 2/16 118/200 |
| 2010/0152361 A1* | 6/2010 | Weaver | C08F 295/00 524/528 |
| 2010/0166997 A1* | 7/2010 | Chisaka | B32B 27/08 428/40.1 |
| 2010/0223881 A1 | 9/2010 | Kalwa | |
| 2010/0260962 A1 | 10/2010 | Chen et al. | |
| 2010/0300030 A1* | 12/2010 | Pervan | B32B 21/02 52/588.1 |
| 2010/0319282 A1 | 12/2010 | Ruland | |
| 2010/0323187 A1 | 12/2010 | Kalwa | |
| 2011/0041996 A1 | 2/2011 | Pervan | |
| 2011/0056167 A1 | 3/2011 | Nilsson et al. | |
| 2011/0104431 A1* | 5/2011 | Niedermaier | B30B 15/062 428/106 |
| 2011/0131901 A1 | 6/2011 | Pervan et al. | |
| 2011/0154763 A1 | 6/2011 | Bergelin et al. | |
| 2011/0167744 A1 | 7/2011 | Whispell et al. | |
| 2011/0177354 A1 | 7/2011 | Ziegler et al. | |
| 2011/0223342 A1* | 9/2011 | Iyer | B05C 5/0241 427/434.4 |
| 2011/0247748 A1 | 10/2011 | Pervan et al. | |
| 2011/0287237 A1* | 11/2011 | Riebel | B32B 27/06 428/195.1 |
| 2011/0300393 A1 | 12/2011 | Iio et al. | |
| 2011/0318507 A1* | 12/2011 | Meersseman | B44B 5/026 427/595 |
| 2012/0003439 A1 | 1/2012 | Chen et al. | |
| 2012/0040149 A1 | 2/2012 | Chen et al. | |
| 2012/0137617 A1 | 6/2012 | Pervan | |
| 2012/0216947 A1* | 8/2012 | Huber | B30B 3/005 156/219 |
| 2012/0279154 A1 | 11/2012 | Bergelin et al. | |
| 2013/0014890 A1 | 1/2013 | Pervan et al. | |
| 2013/0014891 A1* | 1/2013 | Vandevoorde | B44C 5/04 156/277 |
| 2013/0047536 A1 | 2/2013 | Pervan | |
| 2013/0052437 A1 | 2/2013 | Barth | |
| 2013/0095343 A1* | 4/2013 | Arsene | B21B 1/227 428/600 |
| 2013/0111758 A1 | 5/2013 | Nilsson et al. | |
| 2013/0269863 A1 | 10/2013 | Pervan et al. | |
| 2013/0298487 A1 | 11/2013 | Bergelin et al. | |
| 2013/0299454 A1* | 11/2013 | Marxen | B44B 5/026 216/41 |
| 2014/0017452 A1* | 1/2014 | Pervan | E04F 15/043 428/172 |
| 2014/0023832 A1* | 1/2014 | Pervan | E04F 15/02161 428/173 |
| 2014/0033635 A1 | 2/2014 | Pervan et al. | |
| 2014/0115994 A1 | 5/2014 | Pervan | |
| 2014/0141239 A1 | 5/2014 | Ilfrey | |
| 2014/0144583 A1 | 5/2014 | Hakansson et al. | |
| 2014/0147585 A1 | 5/2014 | Smith | |
| 2014/0196618 A1* | 7/2014 | Pervan | B41J 3/28 101/32 |
| 2014/0220318 A1* | 8/2014 | Pervan | D21H 27/28 428/206 |
| 2014/0237924 A1 | 8/2014 | Nilsson et al. | |
| 2014/0283466 A1 | 9/2014 | Boo | |
| 2014/0290171 A1* | 10/2014 | Vermeulen | B44C 5/0476 52/578 |
| 2014/0318061 A1 | 10/2014 | Pervan | |
| 2014/0352248 A1 | 12/2014 | Whispell | |
| 2014/0356594 A1 | 12/2014 | Chen et al. | |
| 2015/0056416 A1* | 2/2015 | Maesen | B44B 5/026 264/293 |
| 2015/0072111 A1* | 3/2015 | Rischer | B29C 33/68 428/195.1 |
| 2015/0158330 A1* | 6/2015 | Stoffel | B44F 9/02 428/141 |
| 2015/0225964 A1 | 8/2015 | Chen et al. | |
| 2015/0251486 A1* | 9/2015 | Hannig | B41M 3/008 428/172 |
| 2015/0258716 A1* | 9/2015 | Hanning | B44F 9/00 264/293 |
| 2016/0016390 A1 | 1/2016 | Lundblad et al. | |
| 2016/0016391 A1 | 1/2016 | Lundblad et al. | |
| 2016/0052245 A1 | 2/2016 | Chen et al. | |
| 2016/0069089 A1 | 3/2016 | Bergelin et al. | |
| 2016/0082625 A1* | 3/2016 | Luukko | B29C 37/0053 428/141 |
| 2016/0108624 A1 | 4/2016 | Nilsson et al. | |
| 2016/0144433 A1* | 5/2016 | Stoffel | B22F 3/1055 |
| 2016/0186318 A1 | 6/2016 | Pervan et al. | |
| 2016/0194883 A1 | 7/2016 | Pervan | |
| 2016/0194885 A1 | 7/2016 | Whispell et al. | |
| 2016/0201324 A1 | 7/2016 | Håkansson et al. | |
| 2016/0265234 A1 | 9/2016 | Pervan | |
| 2017/0037642 A1 | 2/2017 | Boo | |
| 2017/0037645 A1 | 2/2017 | Pervan | |
| 2017/0175400 A1 | 6/2017 | Joseffson et al. | |
| 2017/0232761 A1* | 8/2017 | Pervan | B41J 11/002 347/102 |
| 2017/0241136 A1 | 8/2017 | Kell | |
| 2017/0348984 A1* | 12/2017 | Pervan | C09D 197/02 |
| 2017/0350140 A1 | 12/2017 | Bergelin et al. | |
| 2018/0094441 A1 | 4/2018 | Boo | |
| 2018/0313093 A1 | 11/2018 | Nilsson et al. | |
| 2018/0339504 A1 | 11/2018 | Ziegler | |
| 2019/0091977 A1 | 3/2019 | Lundblad et al. | |
| 2019/0211569 A1 | 7/2019 | Boo et al. | |
| 2019/0249444 A1 | 8/2019 | Kell | |
| 2019/0277041 A1 | 9/2019 | Pervan | |
| 2020/0056379 A1 | 2/2020 | Boo | |
| 2020/0063441 A1 | 2/2020 | Boo | |
| 2020/0180282 A1 | 6/2020 | Lundblad et al. | |
| 2020/0208409 A1 | 7/2020 | Kell | |
| 2020/0248462 A1 | 8/2020 | Bergelin et al. | |
| 2020/0362567 A1 | 11/2020 | Nilsson et al. | |
| 2020/0407981 A1 | 12/2020 | Boo et al. | |
| 2021/0053322 A1 | 2/2021 | Lundblad et al. | |
| 2021/0115680 A1 | 4/2021 | Whispell et al. | |
| 2021/0207385 A1 | 7/2021 | Boo | |
| 2021/0214953 A1 | 7/2021 | Kell | |
| 2021/0230881 A1 | 7/2021 | Boo | |
| 2022/0112726 A1 | 4/2022 | Bergelin et al. | |

FOREIGN PATENT DOCUMENTS

| | | |
|---|---|---|
| DE | 1 815 312 A1 | 7/1969 |
| DE | 103 16 886 A1 | 10/2004 |
| DE | 10 2007 046 532 B3 | 10/2008 |
| DE | 10 2012 005 312 A1 | 9/2013 |
| EP | 0 611 408 A1 | 12/1993 |
| EP | 0 611 408 B1 | 9/1996 |
| EP | 0 732 449 A1 | 9/1996 |
| EP | 0 865 351 A1 | 9/1998 |
| EP | 0 732 449 B1 | 8/1999 |
| EP | 1 209 199 A1 | 5/2002 |
| EP | 0 865 351 B1 | 2/2003 |

(56) References Cited

FOREIGN PATENT DOCUMENTS

| | | |
|---|---|---|
| EP | 1 847 385 A1 | 10/2007 |
| EP | 1 961 556 A1 | 8/2008 |
| EP | 2 123 476 A2 | 11/2009 |
| EP | 2 226 201 A1 | 9/2010 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| EP | 2 263 867 B1 | 3/2012 |
| EP | 2 789 501 A1 | 10/2014 |
| GB | 984 170 A | 2/1965 |
| GB | 1 090 450 | 11/1967 |
| GB | 2 262 940 A | 7/1993 |
| JP | 2001-113664 A | 4/2001 |
| JP | 2001-328210 A | 11/2001 |
| NZ | 225556 | 2/1992 |
| WO | WO 90/06970 A1 | 6/1990 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 01/92037 A2 | 12/2001 |
| WO | WO 2005/051637 A2 | 6/2005 |
| WO | WO 2005/116361 A1 | 12/2005 |
| WO | WO 2006/013469 A1 | 2/2006 |
| WO | WO 2007/015669 A2 | 2/2007 |
| WO | WO 2008/004960 A2 | 1/2008 |
| WO | WO 2009/065769 A2 | 5/2009 |
| WO | WO 2009/116926 A1 | 9/2009 |
| WO | WO 2009/124704 A1 | 10/2009 |
| WO | WO 2010/087752 A1 | 8/2010 |
| WO | WO 2011/033956 A1 | 3/2011 |
| WO | WO 2011/057824 A1 | 5/2011 |
| WO | WO 2011/082491 A1 | 7/2011 |
| WO | WO 2011/087422 A1 | 7/2011 |
| WO | WO 2011/129755 A2 | 10/2011 |
| WO | WO 2011/129757 A1 | 10/2011 |
| WO | WO 2011/141849 A2 | 11/2011 |
| WO | WO 2012/037950 A1 | 3/2012 |
| WO | WO 2012/076608 A1 | 6/2012 |
| WO | WO 2013/079950 A1 | 6/2013 |
| WO | WO 2013/139460 A1 | 9/2013 |
| WO | WO 2014/060402 A1 | 4/2014 |
| WO | WO 2016/010471 A1 | 1/2016 |
| WO | WO 2016/010472 A1 | 1/2016 |

OTHER PUBLICATIONS

U.S. Appl. No. 14/790,774, Christer Lundblad Niclas Håkansson and Göran Ziegler, filed Jul. 2, 2015, (Cited herein as US Patent Application No. 2016/0016390 A1 of Jan. 21, 2016).

U.S. Appl. No. 14/790,850, Christer Lundblad, Niclas Håkansson and Göran Ziegler, filed Jul. 2, 2015, (Cited herein as US Patent Application Publication No. 2016/0016391 A1 of Jan. 21, 2016).

U.S. Appl. No. 15/061,303, Darko Pervan and Göran Ziegler, filed Mar. 4, 2016.

U.S. Appl. No. 15/061,303, Pervan et al.

Sichuan Jieyang Building Materials Co., Ltd., "PVC Flooring Planks With Good Quality," China PVC Flooring; http://harjorflooring.en.made-in-china.com/product/vXFxYDICmks/China-PVC-Flooring-Planks-with-Good-Quality.html, 2013.

Parquet International, "Digital Printing is still an expensive process," Mar. 2006, cover page/pp. 78-79. www.parkettmagazin.com.

Floor Daily, "Shaw Laminates: Green by Design," Aug. 13, 2007, 1 pg, Dalton, GA.

BTLSR Toledo, Inc. website. http://www.bliresins.com/more.html. "Advantages to Using Powdered Resins," May 26, 2007, 2 pages, per the internet Archive WayBackMachine.

Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.

Le Fur. X., et al., "Recycling melamine-impregnated paper waste as board adhesives," published online Oct. 26, 2004, pp. 419-423, vol. 62, Springer-Verlag, DE.

Odian, George, "Principles of Polymerization," 1991, $3^{rd}$ Edition, 5 pages incl. pp. 122-123, John Wiley & Sons, Inc., New York, NY, USA.

Pervan, Darko, et al., U.S. Appl. No. 15/061,303 entitled "Powder Overlay," filed in the U.S. Patent and Trademark Office Mar. 4, 2016.

Extended European Search Report issued in EP 16737613.6, dated Jul. 20, 2018, European Patent Office, Munich, DE, 8 pages.

Pervan, Darko, et al., U.S. Appl. No. 16/416,846 entitled "Powder Overlay," filed in the U.S. Patent and Trademark Office May 20, 2019.

Lundblad, Christer, et al., U.S. Appl. No. 16/113,333 entitleld "Metod to Produce a Thermoplastic Wear Resistant Foil," filed in the U.S. Patent and Trademark Office Aug. 27, 2018.

Lundblad, Christer, et al., U.S. Appl. No. 16/697,565 entitled "Method to Produce a Thermoplastic Wear Resistant Foil," filed in the U.S. Patent and Trademark Office Nov. 27, 2019.

Lundblad, Christer, et al., U.S. Appl. No. 16/992,215 entitled "Method to Produce a Thermoplastic Wear Resistant Foil," filed in the U.S. Patent and Trademark Office Aug. 13, 2020.

\* cited by examiner

METHOD TO PRODUCE A WEAR RESISTANT LAYER WITH DIFFERENT GLOSS LEVELS

CROSS REFERENCE TO RELATED APPLICATIONS

The present application claims the benefit of Swedish Application No. 1550023-4, filed on Jan. 14, 2015. The entire contents of Swedish Application No. 1550023-4 are hereby incorporated herein by reference in their entirety.

FIELD OF THE INVENTION

The present disclosure relates to a method of producing a wear resistant layer having different gloss levels, to a method of producing a building panel comprising a wear resistant layer having different gloss levels, and to such a building panel.

TECHNICAL BACKGROUND

In recent years, so-called Luxury Vinyl Tiles and Planks (LVT) have gained increasing success. These types of floor panels usually comprise a thermoplastic core, a thermoplastic décor layer arranged on the core, a transparent wear resistant layer on the décor layer, and a coating applied on the wear resistant layer. The thermoplastic material is often PVC. The wear resistant layer is conventionally a PVC foil, for example, having a thickness of 0.2-0.7 mm. The core, the décor layer and the transparent wear resistant layer are conventionally pressed together to form the floor panel. The coating applied on the wear resistant layer after pressing is conventionally a UV curing polyurethane coating. The wear resistant layer together with the coating provides the wear resistance of the floor panel and protects the décor layer.

However, when subjecting floor panels to wear, it has been shown that the coating and the wear resistant layer are relatively easily worn down, or at least worn such that the appearance of the wear resistant layer is affected, such as having scratches and/or not being transparent any longer. Compared to a conventional laminate floor panel, the wear resistance of a LVT floor panel is inferior. However, LVT floors offer several advantages over for example laminate floors such as deep embossing, dimensional stability related to humidity, moisture resistance and sound absorbing properties.

By applying a UV curing polyurethane coating as an uppermost layer to the floor panel, the surface of floor panels obtains a uniform gloss level, i.e. the floor panel obtains the gloss level of the coating.

It is known that the gloss level of a UV-curable coating may be differentiated, for example, by subjecting a first a region of the surface coating to polymerization under a first set of conditions, and subjecting a second region of the surface coating to polymerization under a second set of conditions, as disclosed in U.S. Pat. No. 7,276,265, such that regions having different gloss levels are obtained.

GB 2 262 940 discloses a flexible vinyl floor covering having improved anti-slip properties and scratch resistance by including a proportion of polyurethane up to about 15 parts per hundred on the weight of the PVC resin.

WO2013/139460, also published as DE102012005312, discloses a method for manufacturing a floor covering, wherein a layer of elastomeric material is fed to a device for vulcanisation, wherein a separating layer of paper comprises a transfer structure, providing the layer of elastomeric material with different gloss levels.

U.S. Pat. No. 5,787,655 discloses a method for manufacturing a decorative slip-resistant cover system including the step of impacting a softened polymer film with a plurality of beads such that a section of each bead protrudes from the softened polymer film. The beads are approximately 10 to 40 mils in average diameter. A concentration of approximately 200 to 1100 beads per square inch of this diameter provides a sufficient coefficient of friction for the cover system.

SUMMARY

It is an object of at least embodiments of the present invention to provide an improvement over the above described techniques and known art.

A further object of at least embodiments of the present invention is to provide a method of obtaining different gloss levels on a thermoplastic material.

A further object of at least embodiments of the present invention is to exclude the need of a protective coating and to provide different gloss on a wear resistant layer comprising a thermoplastic material.

At least some of these and other objects and advantages that will be apparent from the description have been achieved by a method to produce a wear resistant layer having different gloss levels according to a first aspect of the invention. The method comprises providing a wear resistant layer comprising a thermoplastic material, pressing the wear resistant layer against a pressing device having portions with different gloss levels, such that the wear resistant layer obtains portions having different gloss levels after pressing.

Gloss is an optical property which indicates how well a surface reflects light in a specular direction. For a high gloss surface, a large amount of light is reflected in a specular direction, i.e. that the angle of incidence is substantially equal to the angle of reflection. For a matte surface, the light is diffusely scattered in all directions. Gloss is measured by shining a known amount of light at a surface and quantifying the reflectance. The ratio of reflected to incident light, compared to ratio for the gloss standard, is recorded as gloss units (GU). Gloss may be measured at different angles. At an angle of 60°, high gloss may be defined as a gloss exceeding 70 GU, medium gloss as 10-70 GU, and low gloss as less than 10 GU. By different gloss levels are meant different gloss values measured in GU.

By different gloss levels is preferably meant that the gloss level of a first portion, or a first set of portions, differs from the gloss level of a second portion, or a second set of portions. A first portion, or first set of portions, of the wear resistant layer may have a higher gloss level than a second portion, or second set of portions, of the wear resistant layer. The first portion, or first set of portions, may have a first degree of gloss, and the second portion, or second set of portions, may have a second degree of gloss, being higher or lower than first degree of gloss. The pressing device and the wear resistant layer may have portions with high gloss, for example, higher than 70 GU, and portions being matt, for example, lower than 10 GU. The pressing device, and consequently the wear resistant layer, may have more than two gloss levels, such that any number of different gloss levels.

In one embodiment, the wear resistant layer is substantially transparent. By substantially transparent is meant that the wear resistant layer has a light transmittance index exceeding 80%, preferably exceeding 90% in visible light, for example, light having a wavelength of about 390 to 700 nm. Thereby, any decorative layer or decorative print is visible through the wear resistant layer. Preferably, the wear resistant layer does not influence the impression of any decorative layer or decorative print arranged beneath the wear resistant layer. The wear resistant layer may be non-pigmented.

An advantage of at least embodiment of the invention is that a wear resistant layer of a thermoplastic material having different gloss levels can be obtained. Conventionally, a coating is applied to the wear resistant layer in order to secure sufficient scuff resistance. Thereby, a uniform gloss level is obtained, i.e. the gloss level of the coating. By providing a wear resistant layer having improved wear resistant properties, for example, by including wear resistant particles in the wear resistant layer, the coating can be excluded with maintained, or improved, wear resistance. Thereby, different gloss levels can be provided in the wear resistant layer.

The wear resistant layer requires no additional layer or coating to be applied. The wear resistant layer is adapted to form an uppermost layer of, for example, a building panel. The wear resistant layer is adapted to form a top layer of, for example, a building panel. No additional layer or coating is to be applied on the wear resistant layer.

A top surface of the wear resistant layer may be pressed against the pressing device such that the top surface of the wear resistant layer is provided with the portions having different gloss levels.

The different gloss levels of the wear resistant layer may be adapted to be in register with a decorative pattern such as a printed design.

The wear resistant layer can in a later operation be adhered to a substrate, such as a decorative layer or a core. Alternatively, the wear resistant layer may be adhered to the substrate prior to pressing. The wear resistant layer can, for example, be glued or pressed (with or without an adhesive) to the substrate.

In one embodiment, the wear resistant layer further comprises wear resistant particles and/or scratch resistant particles. The wear resistant particles may comprise aluminium oxide, such as corundum. The scratch and the wear resistant particles may comprise silica. By including wear and/or scratch resistant particles into the wear resistant layer comprising thermoplastic material, the wear and/or scratch resistance of the layer is improved compared to conventional wear resistant foils. An advantage of including wear resistant particles and/or scratch resistant particles in the wear resistant layer is that wear and/scratch resistance can be obtained without increasing the material thickness of the wear resistant layer. Obtaining wear and/or scratch resistance by making the wear resistant layer thicker is more expensive and/or material consuming compared to including wear and/or scratch resistant particles.

The wear resistant particles and/or scratch resistant particles may be substantially encapsulated in the wear resistant layer. By substantially encapsulated is meant that more than 90% of the surface area of the wear and/scratch resistant particles are encapsulated in the wear resistant layer. Preferably, the wear and/or scratch resistant particles do no protrude outside the surface of the wear resistant layer. For example, preferably at least 95% of the particles are substantially encapsulated; optionally at least 99% of the particles. Protruding particles would cause wear on socks, shoes, etc., and cause a rough and/or harsh surface of the wear resistant foil, as provided by a slip resistant surface. The object of the wear and/or scratch resistant particles is to provide wear resistance, not to provide slip resistance.

By being encapsulated in the wear resistant layer, the particles will increase the wear and/or scratch resistance without forming a rough surface as in the case with anti-slip particles, protruding from the surface of the wear resistant layer. Further, wear of press plates and similar is reduced by the wear and/or scratch resistant particles being encapsulated in the wear resistant layer.

The wear resistant particles and/or scratch resistant particles may have an average particle diameter of less than 200 µm, preferably less than 100 µm. In order to ensure transparency of the wear resistant layer, the wear and/or scratch resistant particles preferably have an average particle diameter of less than 200 µm.

The wear and/or scratch resistant particles may have an average particle diameter being less than the thickness of the wear resistant layer. The wear and/or scratch resistant particles may have an average particle diameter being larger than the thickness of the wear resistant layer. However, during pressing, the wear and/or scratch resistant particles are pressed into the first foil such that the wear and/or scratch resistant particles do not protrude beyond an upper surface of the wear resistant layer after pressing, although the wear and/or scratch resistant particles have an average particle diameter exceeding the thickness of the wear resistant layer.

The thermoplastic material may comprise thermoplastic polyurethane (PU) such as thermoplastic aromatic or aliphatic polyurethane, or mixture thereof. The wear resistant layer may comprise a thermoplastic polyurethane (PU) foil. Polyurethane provides improved chemical resistance. Its scuff resistance and micro scratch resistance are also improved. Improved resistance against black heel mark is also provided by a wear resistant layer comprising polyurethane. Preferably, at least an upper portion of the wear resistant layer comprises thermoplastic polyurethane.

The thermoplastic material may comprise polyvinyl chloride (PVC).

The thermoplastic material may comprise polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

In one embodiment, the wear resistant layer comprises pigments.

In one embodiment, the wear resistant layer is printed.

The pressing device may comprise a metal surface, wherein said portions with different gloss levels are provided at said metal surface. The portions having different gloss may be obtained by engraving, abrasive blasting, etching, polishing, such as electropolishing, etc. The different gloss levels may also be obtained by digital printing a substance on the metal surface. The digital print can be in register with a decorative pattern. The metal surface may directly contact the wear resistant layer during pressing.

In one embodiment, the pressing device comprises a thermosetting resin press plate, wherein said portions with different gloss levels are provided at a thermosetting resin surface of the press plate.

The pressing device may comprise a pressing cylinder, a press belt or a press plate, wherein the pressing cylinder, press belt or press plate have portions with different gloss levels. A surface of the pressing cylinder, press belt or press plate may directly contact the wear resistant layer during pressing.

The pressing device may comprise a structure foil, wherein the structure foil is provided with portions having different gloss levels. The portions having different gloss levels can be obtained by digital printing a substance on the structure foil. The portions having different gloss levels may be obtained by pressing a coating applied on a foil against an engraved roller and curing the coating. Alternatively, an aluminium foil having different gloss levels may be used. The digital print can be in register with a decorative pattern.

The structure foil may be a paper foil, a plastic foil, or a metal foil such as an aluminium foil.

The different gloss levels of the wear resistant layer may be formed by a micro structure in the wear resistant layer including portions having a maximum depth of 30 µm.

The method may further comprise forming embossed portions in the wear resistant layer, preferably having a depth exceeding 100 µm. The embossing may be in register with a decorative pattern of the building panel. The embossed portions can be in register with portions having different gloss levels and the decorative pattern. Forming the embossed portions may be performed together with forming the portions having different gloss levels, prior to forming portions having different gloss levels, or after forming portions having different gloss levels.

The method may further comprise applying the wear resistant layer on a substrate prior to pressing.

The substrate may comprise a decorative layer. The decorative layer may be arranged on a core. The decorative properties of the decorative layer may be provided by a decorative pattern, for example a printed design. The decorative layer may comprise a thermoplastic material.

The wear resistant layer may have a printed design on a surface, preferably on a surface opposite the surface provided with the different gloss levels.

The substrate may be a core. A surface of the core may be provided with a decorative pattern, for example a printed design.

The substrate may comprise a thermoplastic material.

According to a second aspect of the present invention, a method to produce a building panel having different gloss levels is provided. The method comprises providing a substrate, applying a wear resistant layer comprising a thermoplastic material on the substrate, and pressing the substrate and the wear resistant layer together, thereby forming a building panel, wherein the wear resistant layer is pressed against a pressing device having portions with different gloss levels, such that the wear resistant layer obtains portions having different gloss levels after pressing.

The wear resistant layer may be pressed against the pressing device having portions with different gloss levels when pressing the substrate and the wear resistant layer together for forming the building panel, or separate from, prior of after, the step of pressing the substrate and the wear resistant layer together for forming the building panel.

Gloss is an optical property which indicates how well a surface reflects light in a specular direction. For a high gloss surface, a large amount of light is reflected in a specular direction, i.e. that the angle of incidence is substantially equal to the angle of reflection. For a matte surface, the light is diffusely scattered in all directions. Gloss is measured by shining a known amount of light at a surface and quantifying the reflectance. The ratio of reflected to incident light, compared to ratio for the gloss standard, is recorded as gloss units (GU). Gloss may be measured at different angles. At an angle of 60°, high gloss may be defined as a gloss exceeding 70 GU, medium gloss as 10-70 GU, and low gloss as less than 10 GU. By different gloss levels are meant different gloss values measured in GU.

By different gloss levels is preferably meant that the gloss level of a first portion, or a first set of portions, differs from the gloss level of a second portion, or a second set of portions. The first portion, or the first set of portions, of the wear resistant layer may have a higher gloss level than the second portion, or the second set of portions of the wear resistant layer. The first portion, or the first set of portions, may have a first degree of gloss, and the second portion, or the second set of portions, may have a second degree of gloss, being higher or lower than first degree of gloss. The pressing device and the wear resistant layer may have portions with high gloss, for example, higher than 70 GU, and portions being matt, for example lower than 10 GU. The pressing device, and consequently the wear resistant layer, may have more than two gloss levels, such that any number of different gloss levels.

In one embodiment, the wear resistant layer is substantially transparent. By substantially transparent is meant that the wear resistant layer has a light transmittance index exceeding 80%, preferably exceeding 90% in visible light, for example, having a wavelength of about 390 to 700 nm. Thereby, any decorative layer or decorative print is visible through the wear resistant layer. Preferably, the wear resistant layer does not influence of the impression of any decorative layer or decorative print arranged beneath the wear resistant layer. The wear resistant layer may be non-pigmented.

An advantage of at least embodiment of the invention is that a wear resistant layer of a thermoplastic material having different gloss levels can be obtained. Conventionally, a coating is applied to the wear resistant layer and a uniform gloss levels is obtained. By providing a wear resistant layer having improved wear resistant properties, for example, by including wear resistant particles in the wear resistant layer, the coating can be excluded with maintained, or improved, wear resistance. Thereby, different gloss levels can be provided in the wear resistant layer.

Consequently, a building panel can thereby be obtained comprising different gloss levels. The building panel requires no additional layer or coating to be applied. The wear resistant layer forms the uppermost layer of the building panel. The wear resistant layer forms the top layer of the building panel. No additional layer or coating is applied on the wear resistant layer.

The different gloss levels of the wear resistant layer may be adapted to be in register with a decorative pattern such as a printed design.

A top surface of the wear resistant layer may be pressed against the pressing device such that the top surface of the wear resistant layer is provided with the portions having different gloss levels.

The wear resistant layer may comprise wear resistant particles and/or scratch resistant particles. The wear and the scratch resistant particles may comprise aluminium oxide such as corundum. The wear and the scratch resistant particles may comprise silica. By including wear and/or scratch resistant particles into the wear resistant layer comprising thermoplastic material, the wear and/or scratch resistance of the layer is improved compared to conventional wear resistant layers. An advantage of including wear resistant particles and/or scratch resistant particles in the wear resistant layer is that wear and/scratch resistance can be obtained without increasing the material thickness of the wear resistant layer. Obtaining wear and/or scratch resistance by making the wear resistant layer thicker is more expensive and/or material consuming compared to including wear and/or scratch resistant particles.

The wear resistant particles and/or scratch resistant particles may be substantially encapsulated in the wear resistant layer. By substantially encapsulated is meant that more than 90% of the surface area of the wear and/scratch resistant particles are encapsulated in the wear resistant layer. Preferably, the wear and/or scratch resistant particles do no protrude outside the surface of the wear resistant layer. For example, preferably at least 95% of the particles are substantially encapsulated; optionally at least 99% of the particles. Protruding particles would cause wear on socks, shoes etc., and cause a rough and/or harsh surface of the wear resistant foil, as provided by a slip resistant surface. The object of the wear and/or scratch resistant particles is to provide wear resistance, not to provide slip resistance.

By being encapsulated in the wear resistant layer, the particles will increase the wear and/or scratch resistance without forming a rough surface as in the case with anti-slip particles, protruding from the surface of the wear resistant layer. Further, wear of press plates and similar is reduced by the wear and/or scratch resistant particles being encapsulated in the wear resistant layer.

The wear resistant particles and/or scratch resistant particles may have an average particle diameter of less than 200 µm, preferably less than 100 µm. In order to ensure transparency of the wear resistant layer, the wear and/or scratch resistant particles preferably have an average particle diameter of less than 100 µm.

The wear and/or scratch resistant particles may have an average particle diameter being less than the thickness of the wear resistant layer. The wear and/or scratch resistant particles may have an average particle diameter being larger than the thickness of the wear resistant layer. However, during pressing, the wear and/or scratch resistant particles are pressed into the first foil such that the wear and/or scratch resistant particles do not protrude beyond an upper surface of the wear resistant layer after pressing, although the wear and/or scratch resistant particles have an average particle diameter exceeding the thickness of the wear resistant layer.

The thermoplastic material may comprise thermoplastic polyurethane (PU) such as thermoplastic aromatic or aliphatic polyurethane, or mixture thereof. The wear resistant layer may comprise a thermoplastic polyurethane (PU) foil. Polyurethane provides improved chemical resistance. Its scuff resistance and micro scratch resistance are also improved. Improved resistance against black heel mark is also provided by a wear resistant layer comprising polyurethane. Preferably, at least an upper portion of the wear resistant layer comprises thermoplastic polyurethane.

The thermoplastic material of the wear resistant layer may comprise polyvinylchloride (PVC).

The thermoplastic material may comprise polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

In one embodiment, the wear resistant layer comprises pigments.

In one embodiment, the wear resistant layer is printed.

The pressing device may comprise a metal surface, wherein said portions with different gloss levels are provided at said metal surface. The portions having different gloss may be obtained by engraving, abrasive blasting, etching, polishing such as electropolishing etc. The different gloss levels may also be obtained by digital printing a substance on the metal surface. The digital print can be in register with a decorative pattern. The metal surface may directly contact the wear resistant layer during pressing.

In one embodiment, the pressing device comprises a thermosetting resin press plate, wherein said portions with different gloss levels are provided at a thermosetting resin surface of the press plate.

The pressing device may comprise a pressing cylinder, a press belt or a press plate, wherein the pressing cylinder, press belt or press plate have portions with different gloss levels. A surface of the pressing cylinder, press belt or press plate may directly contact the wear resistant layer during pressing.

The pressing device may comprise a structure foil, wherein the structure foil is provided with portions having different gloss levels. The portions having different gloss levels can be obtained by digital printing a substance on the structure foil. The portions having different gloss levels may be obtained by pressing a coating applied on a foil against an engraved roller and curing the coating. Alternatively, an aluminium foil having different gloss levels may be used. The digital print can be in register with a decorative pattern.

The structure foil may be a paper foil, a plastic foil, or a metal foil such as an aluminium foil.

The step of applying the wear resistant layer may comprise applying the thermoplastic material in powder form on the substrate.

The step of applying the wear resistant layer may comprise applying a mix comprising the thermoplastic material in powder form and wear resistant particles.

The step of applying the wear resistant layer may comprise applying a first layer comprising a thermoplastic material, applying wear resistant particles on the first layer, and applying a second layer comprising a thermoplastic material on the wear resistant particles.

The first layer may comprise polyvinylchloride (PVC) and the second layer comprises polyurethane (PU).

The wear resistant layer may be a thermoplastic foil.

The wear resistant layer may be formed by applying a coating on the substrate. The coating may be a radiation curable coating, preferably UV curable coating. The coating may comprise acrylate or methacrylate monomers or oligomers. The coating may be cured prior or after pressing.

The different gloss levels of the wear resistant layer may be formed by a micro structure including portions having a maximum depth of 30 µm.

The method may further comprise forming embossed portions in the wear resistant layer, preferably having a depth exceeding 100 µm. The embossing may be in register with a decorative pattern. The embossed portions can be in register with portions having different gloss levels and the decorative pattern. Forming the embossed portions may be performed together with forming the portions having different gloss levels, prior to forming portions having different gloss levels, or after forming portions having different gloss levels.

The substrate may comprise a thermoplastic material.

The thermoplastic material of the substrate may comprise polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

The substrate may comprise a decorative layer. The decorative layer may be arranged on a core. The decorative properties of the decorative layer may be provided by a decorative pattern, for example a printed design. The decorative layer may comprise a thermoplastic material.

The substrate may be a core. A surface of the core may be provided with a decorative pattern, for example a printed design.

Alternatively, the wear resistant layer may have a printed design on a surface, preferably on a surface opposite the surface provided with the different gloss levels.

According to a third aspect of the present invention, a building panel is provided. The building panel comprises a substrate, a wear resistant layer arranged on the substrate, wherein the wear resistant layer comprises a thermoplastic material, and wherein the wear resistant layer is provided with portions having different gloss levels.

Gloss is an optical property which indicates how well a surface reflects light in a specular direction. For a high gloss surface, a large amount of light is reflected in a specular direction, i.e. that the angle of incidence is substantially equal to the angle of reflection. For a matte surface, the light is diffusely scattered in all directions. Gloss is measured by shining a known amount of light at a surface and quantifying the reflectance. The ratio of reflected to incident light, compared to ratio for the gloss standard, is recorded as gloss units (GU). Gloss may be measured at different angles. At an angle of 60°, high gloss may be defined as a gloss exceeding 70 GU, medium gloss as 10-70 GU, and low gloss as less than 10 GU. By different gloss levels are meant different gloss values measured in GU.

By different gloss levels is preferably meant that the gloss level of a first portion, or a first set of portions, differs from the gloss level of a second portion, or a second set of portions. The first portion, or the first set of portions, of the wear resistant layer may have a higher gloss level than the second portion, or the second set of portions, of the wear resistant layer. The first portion, or first set of portions, may have a first degree of gloss, and the second portion, or second set of portions, may have a second degree of gloss, being higher or lower than first degree of gloss. The wear resistant layer may have portions having high gloss, and portions being matt. The wear resistant layer may have more than two gloss levels, such that any number of different gloss levels.

In one embodiment, the wear resistant layer is substantially transparent. By substantially transparent is meant that the wear resistant layer has a light transmittance index exceeding 80%, preferably exceeding 90% in visible light, for example, having a wavelength of about 390 to 700 nm. Thereby, any decorative layer or decorative print is visible through the wear resistant layer. Preferably, the wear resistant layer does not influence of the impression of any decorative layer or decorative print arranged beneath the wear resistant layer. The wear resistant layer may be non-pigmented.

An advantage of embodiments of the third aspect of the invention is that a building panel comprising a wear resistant layer provided with portions having different gloss is provided. Since no coating is applied on the wear resistant layer, the wear resistant layer can be provided with portions with different gloss levels. The wear resistant layer forms the uppermost layer of the building panel. The wear resistant layer forms the top layer of the building panel. No additional layer or coating is applied on the wear resistant layer.

A top surface of the wear resistant layer is provided with the portions having different gloss levels.

The building panel can be provided with portions with different gloss levels, wherein the portions with different gloss levels are in register with a decorative pattern or printed design of the building panel. Further, the building panel can be provided with embossed portions, wherein the embossed portions can be in register with the decorative pattern or printed design of the building panel.

The substrate may comprise a decorative layer. The decorative layer may be arranged on a core. The decorative properties of the decorative layer may be provided by a decorative pattern, for example a printed design. The decorative layer may comprise a thermoplastic material. The decorative layer may be a wood veneer layer, a cork layer or a decorative paper.

The substrate may be a core. A surface of the core may be provided with a decorative pattern, for example a printed design.

Alternatively, the wear resistant layer may have a printed design on a surface, preferably on a surface opposite the surface provided with the different gloss levels.

The portions of the wear resistant layer having different gloss levels may be formed in register with the decorative pattern or printed design.

The wear resistant layer may be embossed in register with the decorative pattern.

The portions having different gloss may be formed in register with decorative pattern or printed design and in register with the embossing of the wear resistant layer. A portion having higher gloss may be coordinated with a lower embossed portion of the wear resistant layer. A portion having lower gloss may be coordinated with a higher located portion of the wear resistant layer. The opposite is also possible depending on the design and desired appearance of the building panel.

The different gloss levels may be formed by a micro structure including portions having a maximum depth of 30 µm.

The wear resistant layer may further comprise embossed portions in the wear resistant layer, preferably having a depth exceeding 100 µm.

In one embodiment, the wear resistant layer comprises pigments.

In one embodiment, the wear resistant layer is printed.

The thermoplastic material of the wear resistant layer may comprise polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise thermoplastic polyurethane (PU) such as such as thermoplastic aromatic or aliphatic polyurethane, or mixture thereof. The thermoplastic material may comprise an ionomer, for example of polyethylene. The thermoplastic material may be a casting resin or hot melt.

The wear resistant layer may comprise wear resistant particles and/or scratch resistant particles, for example, aluminium oxide such as corundum. The wear and the scratch resistant particles may comprise aluminium oxide such as corundum. The wear and the scratch resistant particles may comprise silica. By including wear and/or scratch resistant particles into the wear resistant layer comprising thermoplastic material, the wear and/or scratch resistance of the layer is improved compared to conventional wear resistant foils. An advantage of including wear resistant particles and/or scratch resistant particles in the wear resistant layer is that wear and/scratch resistance can be obtained without increasing the material thickness of the wear resistant layer. Obtaining wear and/or scratch resistance by making the wear resistant layer thicker is more expensive and/or material consuming compared to including wear and/or scratch resistant particles.

The wear resistant particles and/or scratch resistant particles may be substantially encapsulated in the wear resistant layer. By substantially encapsulated is meant that more than 90% of the surface area of the wear and/scratch resistant particles are encapsulated in the wear resistant layer. Preferably, the wear and/or scratch resistant particles do no protrude outside the surface of the wear resistant layer. For example, preferably at least 95% of the particles are substantially encapsulated; optionally at least 99% of the particles. Protruding particles would cause wear on socks, shoes etc., and cause a rough and/or harsh surface of the wear resistant foil, as provided by a slip resistant surface. The object of the wear and/or scratch resistant particles is to provide wear resistance, not to provide slip resistance.

By being encapsulated in the wear resistant layer, the particles will increase the wear and/or scratch resistance without forming a rough surface as in the case with anti-slip particles, protruding from the surface of the wear resistant layer. Further, wear of press plates and similar is reduced by the wear and/or scratch resistant particles being encapsulated in the wear resistant layer.

The wear resistant particles and/or scratch resistant particles may have an average particle diameter of less than 200 µm, preferably less than 100 µm. In order to ensure transparency of the wear resistant layer, the wear and/or scratch resistant particles preferably have an average particle diameter of less than 100 µm.

The wear and/or scratch resistant particles may have an average particle diameter being less than the thickness of the wear resistant layer. The wear and/or scratch resistant particles may have an average particle diameter being larger than the thickness of the wear resistant layer. However, during pressing, the wear and/or scratch resistant particles are pressed into the first foil such that the wear and/or scratch resistant particles do not protrude beyond an upper surface of the wear resistant layer after pressing, although the wear and/or scratch resistant particles have an average particle diameter exceeding the thickness of the wear resistant layer.

According to a fourth aspect of the present invention, a wear resistant layer having different gloss levels is provided. The wear resistant layer comprises a thermoplastic material, and wherein the wear resistant layer is provided with portions having different gloss levels.

Gloss is an optical property which indicates how well a surface reflects light in a specular direction. For a high gloss surface, a large amount of light is reflected in a specular direction, i.e. that the angle of incidence is substantially equal to the angle of reflection. For a matte surface, the light is diffusely scattered in all directions. Gloss is measured by shining a known amount of light at a surface and quantifying the reflectance. The ratio of reflected to incident light, compared to ratio for the gloss standard, is recorded as gloss units (GU). Gloss may be measured at different angles. At an angle of 60°, high gloss may be defined as a gloss exceeding 70 GU, medium gloss as 10-70 GU, and low gloss as less than 10 GU. By different gloss levels are meant different gloss values measured in GU.

By different gloss levels is preferably meant that the gloss level of a first portion, or a first set of portions, differs from the gloss level of a second portion, or a second set of portions. A first portion, or first set of portions, of the wear resistant layer may have a higher gloss level than a second portion, or second set of portions, of the wear resistant layer. The first portion, or first set of portions, may have a first degree of gloss, and the second portion, or second set of portions, may have a second degree of gloss, being higher or lower than first degree of gloss. The wear resistant layer may have portions with high gloss, and portions being matt. The wear resistant layer may have more than two gloss levels, such that any number of different gloss levels.

A top surface of the wear resistant layer is provided with the portions having different gloss levels.

In one embodiment, the wear resistant layer is substantially transparent. By substantially transparent is meant that the wear resistant layer has a light transmittance index exceeding 80%, preferably exceeding 90% in visible light, for example, having a wavelength of about 390 to 700 nm. Thereby, any decorative layer or decorative print is visible through the wear resistant layer. Preferably, the wear resistant layer does not influence of the impression of any decorative layer or decorative print arranged beneath the wear resistant layer. The wear resistant layer may comprise wear resistant particles and/or scratch resistant particles, for example, aluminium oxide such as corundum.

The wear resistant particles and/or scratch resistant particles may be substantially encapsulated in the wear resistant layer. By substantially encapsulated is meant that more than 90% of the surface area of the wear and/scratch resistant particles are encapsulated in the wear resistant layer. Preferably, the wear and/or scratch resistant particles do no protrude outside the surface of the wear resistant layer. Preferably, the wear and/or scratch resistant particles do no protrude outside the surface of the wear resistant layer. For example, preferably at least 95% of the particles are substantially encapsulated; optionally at least 99% of the particles. Protruding particles would cause wear on socks, shoes etc., and cause a rough and/or harsh surface of the wear resistant foil, as provided by a slip resistant surface. The object of the wear and/or scratch resistant particles is to provide wear resistance, not to provide slip resistance.

The wear resistant particles and/or scratch resistant particles may have an average particle diameter of less than 200 µm, preferably less than 100 µm. In order to ensure transparency of the wear resistant layer, the wear and/or scratch resistant particles preferably have an average particle diameter of less than 200 µm.

The thermoplastic material of the wear resistant layer may comprise polyvinyl chloride (PVC), polyurethane (PU), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise thermoplastic polyurethane (PU) such as such as thermoplastic aromatic or aliphatic polyurethane, or mixture thereof. The thermoplastic material may comprise an ionomer, for example of polyethylene. The thermoplastic material may be a casting resin or hot melt.

Embodiments of the fourth aspect of the present invention may incorporate all the advantages of the first aspect of the invention, which previously have been discussed, whereby the previous discussion is applicable also for the wear resistant layer.

According to a fifth aspect, a method to produce a wear resistant layer having a top surface is provided, the top surface having different gloss levels. The method comprises providing a wear resistant layer comprising a thermoplastic material, polishing portions of the top surface of the wear resistant layer such that the portions being polished obtain a different gloss level compared to portions of the top surface of the wear resistant layer not being polished.

According to a sixth aspect, a method to produce a building panel having different gloss levels is provided. The method comprises providing a substrate, applying a wear resistant layer comprising a thermoplastic material on the substrate, and pressing the substrate and the wear resistant layer together, thereby forming a building panel, polishing portions of the top surface of the wear resistant layer such that the portions being polished obtains a different gloss level compared portions of the top surface of the wear resistant layer not being polished.

Embodiments of the fifth and sixth aspects may incorporate all the advantages of the first and second aspect of the invention, respectively which previously have been discussed, whereby the previous discussion is applicable also for the fifth and sixth aspects. The definition of gloss and gloss levels is applicable also for the fifth and sixth aspects.

In the fifth and the sixth aspects:

In one embodiment, the method comprises pressing the top surface of the top surface of the wear resistant layer against an embossed pressing device such that an embossed structure is obtained in the top surface of the wear resistant layer, and polishing protruding portions of the embossed structure such that the protruding portions obtains a different gloss level compared to a gloss level of embossed portions of the top surface of the wear resistant layer.

In one embodiment, portions of the top surface of the wear resistant layer is masked, preferably after pressing, and non-masked portions of the top surface of the wear resistant layer are polished, such that the non-masked portions obtains a different gloss level compared to a gloss level of the masked portions.

The wear resistant layer may be substantially transparent as described above and having the meaning described above. The wear resistant layer may be non-pigmented.

The different gloss levels of the wear resistant layer may be adapted to be in register with a decorative pattern such as a printed design.

The wear resistant layer further comprises wear resistant particles and/or scratch resistant particles.

The wear resistant particles and/or scratch resistant particles may be substantially encapsulated in the wear resistant layer.

The wear resistant particles and/or scratch resistant particles may have an average particle diameter of less than 200 µm, preferably less than 100 µm. In order to ensure transparency of the wear resistant layer, the wear and/or scratch resistant particles preferably have an average particle diameter of less than 200 µm.

The thermoplastic material may comprise thermoplastic polyurethane (PU) such as thermoplastic aromatic or aliphatic polyurethane, or mixture thereof. The wear resistant layer may comprise a thermoplastic polyurethane (PU) foil.

The thermoplastic material may comprise polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may be a casting resin or hot melt.

The wear resistant layer may comprise pigments.

The wear resistant layer may be printed.

The embossed structure may be in register with a decorative pattern of the building panel.

The substrate may comprise a decorative layer. The decorative layer may be arranged on a core. The decorative properties of the decorative layer may be provided by a decorative pattern, for example a printed design. The decorative layer may comprise a thermoplastic material.

The wear resistant layer may have a printed design on a surface, preferably on a surface opposite the surface provided with the different gloss levels.

The substrate may be a core. A surface of the core may be provided with a decorative pattern, for example a printed design. The substrate may comprise a thermoplastic material.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
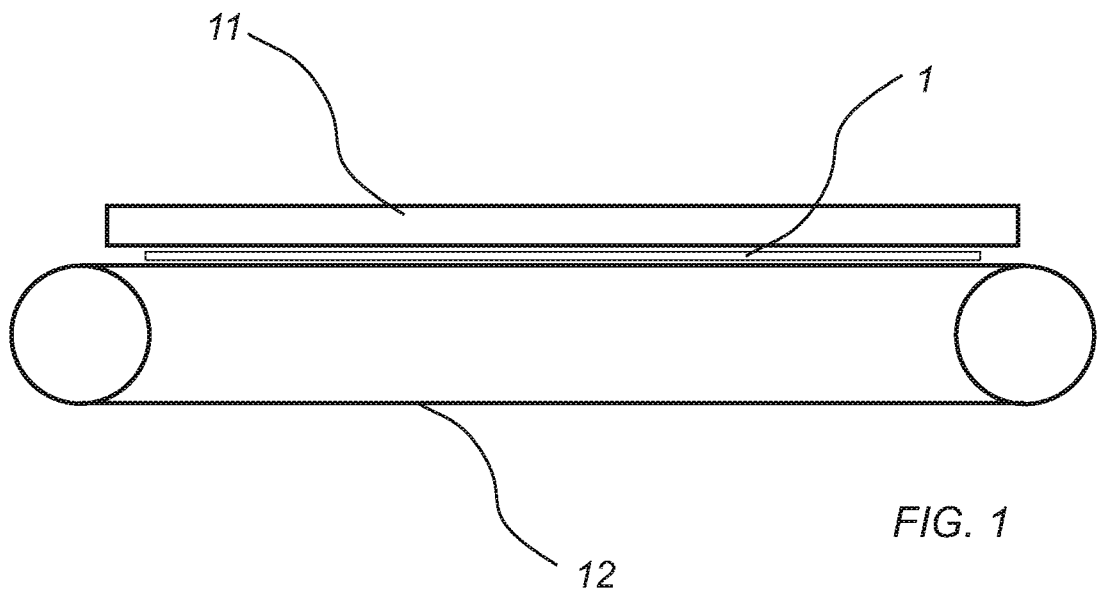
FIG. 1 shows a method to produce a wear resistant layer.

In FIG. 1, a wear resistant layer 1 is arranged on a conveyor 12. The wear resistant layer 1 may be a foil. In one embodiment, the wear resistant layer 1 is formed by a powder layer applied on a substrate 2, for example, on the conveyor 12. The wear resistant layer 1 may be formed in an extrusion process such as extrusion blowing.

The wear resistant layer 1 comprises a thermoplastic material. The thermoplastic material may comprise polyurethane (PU), polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene. The thermoplastic material may comprise thermoplastic polyurethane (PU) such as such as thermoplastic aromatic or aliphatic polyurethane, or mixture thereof. The thermoplastic material may be a casting resin or hot melt.

Preferably, the wear resistant layer 1 is formed of the thermoplastic material. The wear resistant layer 1 may substantially consist essentially of the thermoplastic material, optionally wear and/or scratch resistant particles and optionally additives. Additives may be plasticizers, stabilizers, lubricants, degassing agents, coupling agents, compatibilizers, crosslinking agents, etc. In embodiments, the additives comprise no more than 5% by weight, preferably 3% by weight, of the wear resistant layer. In embodiments, the thermoplastic material is at least 95% by weight of the wear resistant layer. The wear resistant layer 1 may be free from thermosetting resins.

In one embodiment, the wear resistant layer 1 is a thermoplastic wear resistant foil. The foil may be thermoplastic PU foil such as thermoplastic aromatic or aliphatic polyurethane foil, PVC foil, or a foil of any other thermoplastic material mentioned above.

Wear resistant particles and/or scratch resistant particles, for example aluminium oxide such as corundum or silica, may be included in the wear resistant foil, for example included in the extrusion process. In one embodiment, wear and/or scratch resistant particles are arranged between a first and a second thermoplastic foil. The first and the second thermoplastic foil may comprise different thermoplastic material. The first foil may comprise PVC. The second foil may comprise thermoplastic PU. The second foil is adapted to face upwards, away from the substrate. The second foil is adapted to contact a pressing device in a pressing step.

In one embodiment, the wear resistant layer 1 is formed by a powder layer. The powder layer may comprise a thermoplastic material such as polyurethane (PU), polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise an ionomer, for example of polyethylene.

The powder layer is applied on the substrate such as on the conveyor 12. The powder layer may also comprise wear resistant particles and/or scratch resistant particles, for example aluminium oxide, such as corundum, or silica.

The wear resistant layer 1 may be formed by any of the methods disclosed in SE2015/050782 or in SE2015/050783, the entire contents of each is expressly incorporated by reference herein.

By scratch resistant particles are meant particles improving the scratch or scratch resistant properties. The scratch resistant particles may be or comprise nano-sized silica particles, preferably fused silica particles. The scratch resistant particles may be or comprise aluminium oxide. The scratch resistant particles may be disc shaped particles, preferably having a width/thickness ratio being equal or exceeding 3:1, more preferably being equal or exceeding 5:1. Such disc-shaped particles orientate along the surface of the layer, thereby improving the scratch resistance of the wear resistant layer. The scratch resistant particles may have an average particle diameter of 1-50 µm, preferably 10-20 µm.

The wear resistant particles may be aluminium oxide particles such as corundum. Alternatively, or as a complement, the wear resistant particles may be carborundum, quartz, silica, glass, glass beads, glass spheres, silicon carbide, diamond particles, hard plastics, reinforced polymers and organics. The wear resistant particles preferably have an average particle diameter of 10-200 µm, preferably 50-100 µm, more preferably 25-100 µm. The wear resistant particles may have an average particle diameter of less than 200 µm, preferably less than 100 µm, and more preferably less than 75 µm such that less than 45 µm. The wear resistant particles may have an irregular shape. The wear resistant particles 4 may be surface treated. The wear resistant particles 4 may be silane-treated particles.

The refractive index of the wear resistant particles may be 1.4-1.7. In one embodiment, the wear resistant particle may have a refractive index of 1.4-1.9, preferably 1.5-1.8, for example, 1.7-1.8. Preferably, the refractive index of the wear resistant particles does not differ from the refractive index of the wear resistant layer 1 more than ±20%.

Preferably, both the wear resistant particles and/or the scratch resistant particles do not protrude outside the surface of the wear resistant layer. Preferably, the wear resistant particles and/or the scratch resistant particles are substantially encapsulated in the wear resistant layer. Preferably, more than 90% of the surface area of the wear and/or scratch resistant particles are encapsulated in the wear resistant layer. Preferably, the wear and/or scratch resistant particles do no protrude outside the surface of the wear resistant layer. For example, preferably at least 95% of the particles are substantially encapsulated; optionally at least 99% of the particles The wear resistant particles may be applied in an amount of 20-100 g/m$^2$, preferably in an amount of 40-60 g/m$^2$.

A top surface of the wear resistant layer 1 is pressed against a pressing device 11 having different gloss levels. A press surface of the pressing device may have portions having high gloss, or even super high gloss levels and portions being matt. The different gloss levels are provided with a micro structure or micro embossings having a maximum depth of 30 µm. The higher depth of the micro structure, the more the portion or portions having a matt texture. The lower depth of the micro structure, the more glossy portion or portions. The depth of the micro embossing may vary over the surface of the pressing device 11 such that varying gloss levels are obtained. When pressing the top surface of the wear resistant layer 1 against the micro structure or micro embossings, the top surface of the wear resistant layer 1 obtains portions having different gloss levels, corresponding to the gloss levels of the press surface of the pressing device. The gloss levels may be varying over the top surface of the wear resistant layer 1. By different gloss levels is preferably meant that the gloss level of a first portion, or a first set of portions, differs from the gloss level of a second portion, or a second set of portions. The first portion, or the first set of portions, may have a higher gloss level than the second portion, or the second set of portions. The first portion, or first set of portions, may have a first degree of gloss, and the second portion, or second set of portions, may have a second degree of gloss, being higher or lower than first degree of gloss.

The pressing device 11 may also be provided with a macro structure with protrusions for forming macro embossings or a macro structure of the top surface of the wear resistant layer 1.

The pressing device 11 may comprise a metal surface provided with the different gloss levels. The metal surface of the pressing device is adapted to directly contact the wear resistant layer 1. The pressing device 11 may be a pressing cylinder or pressing plate provided with the different gloss levels, wherein the pressing cylinder or pressing plate directly contacts the wear resistant layer 1.

The pressing device 11 may comprise a structure foil provided with different gloss levels. The structure foil is adapted to directly contact the wear resistant layer 1. The structure foil may be arranged between the wear resistant layer 1 and a press plate, press belt, or press cylinder during pressing.

The wear resistant layer 1 is pressed against the pressing device 11. Preferably, heat is also applied. The pressing device 11 may be a static press or a continuous press.

The top surface of the wear resistant layer 1 may be provided with a release agent in order to avoid that the wear resistant layer 1 sticks to the pressing device 11. Since no additional layer is to be applied on the wear resistant layer 1, a release agent can be applied on the wear resistant layer 1, thereby facilitating the pressing operation.

The wear resistant layer 1 having portions with different gloss levels may be substantially transparent after pressing. The different gloss levels are formed by a micro structure in the surface, preferably having a maximum depth of 30 μm. The different gloss levels may be formed in register with a decorative pattern or printed design. The decorative pattern or printed design may be formed on a surface of the wear resistant layer 1, preferably opposite the surface having portions with different gloss. Alternatively, the wear resistant layer 1 may be arranged on a substrate provided with a decorative pattern, to which the wear resistant layer 1 later is adhered.

The top surface of the wear resistant layer 1 may also be provided with embossed portions during pressing. The pressing device 11 such as the press plate, the press cylinder, press belt or structure foil may be provided with protrusions forming embossing or macro structure in the wear resistant layer 1. Alternatively, the embossed portions may be formed in a separate step from forming the portions having different gloss levels. The embossing is preferably in register with the decorative pattern or printed design. The decorative pattern or printed design may be formed on a surface of the wear resistant layer 1, preferably opposite the surface having portions with different gloss levels. Alternatively, the wear resistant layer 1 may be arranged on a substrate 2 provided with a decorative pattern or printed design, to which the wear resistant layer 1 later is adhered.

The thickness of the wear resistant layer 1 after pressing may be 0.01-1 mm such as 0.01-0.1 mm. Preferably, the wear resistant layer 1 has a thickness of less than 0.5 mm after pressing.

The wear resistant layer 1 may be adhered to a substrate 2 in a subsequent processing step. The wear resistant layer 1 may be adhered by pressing or by an adhesive to the substrate 2.

Figure 3A:
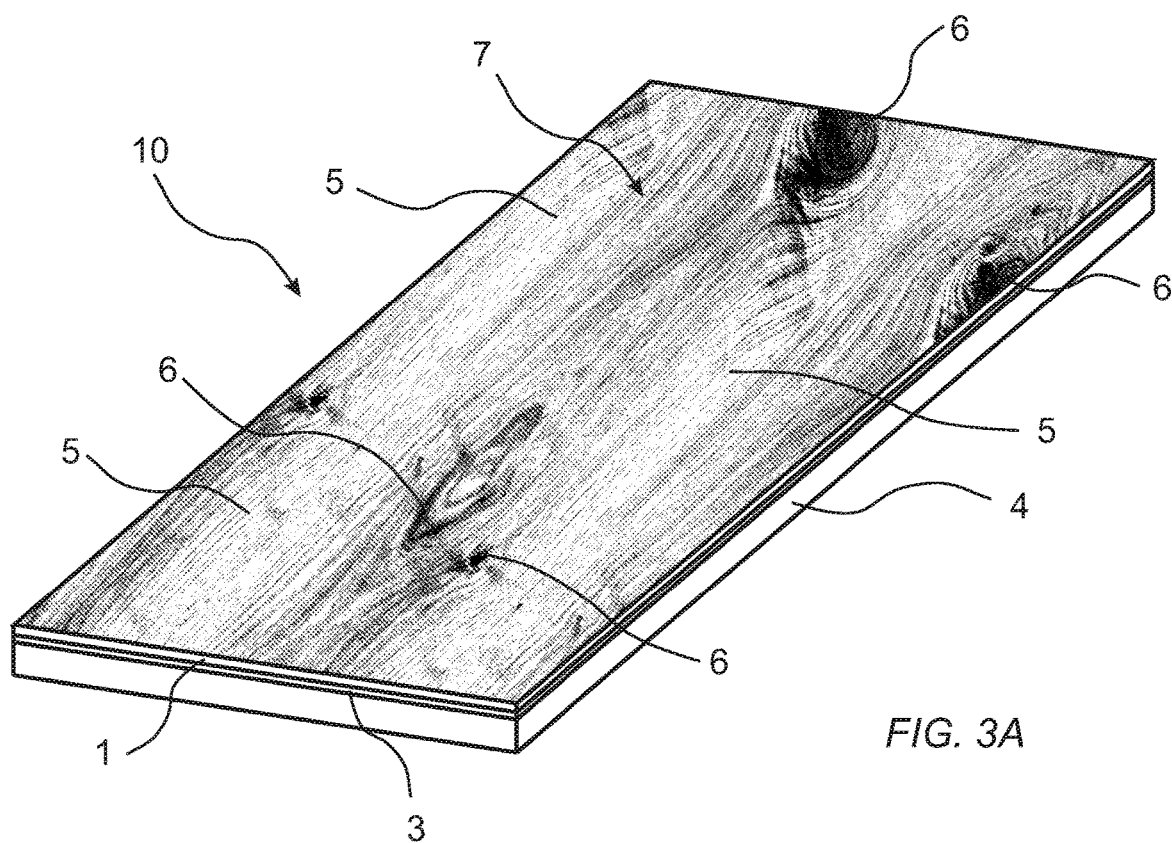
FIGS. 3A-C shows different embodiment of a building panel.

The substrate 2 may comprise thermoplastic material such as PVC or PU. The substrate 2 may be a core 4 or a decorative layer 3. The substrate 2 may comprise a core 4 and a decorative layer 3 arranged on the core 4, as shown in FIG. 3A. If the wear resistant layer 1 is pigmented and/or provided with a print, the decorative layer 3 may be excluded.

Alternatively, the wear resistant layer 1 is adhered to a substrate 2 during pressing, which will be described in more detail with reference to FIG. 2.

Figure 2:
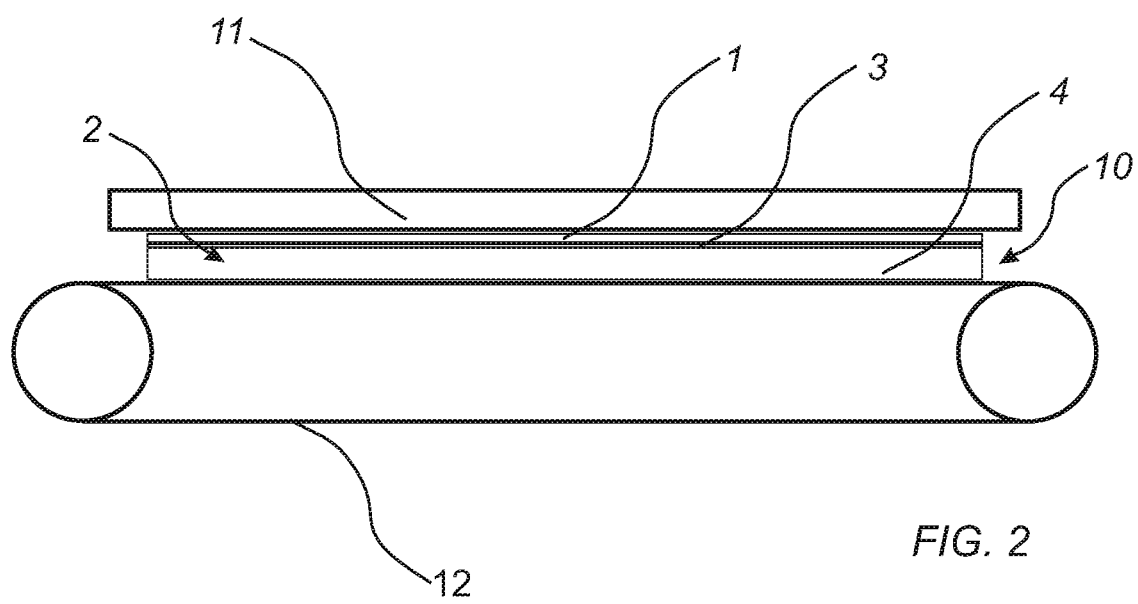
FIG. 2 shows a method to produce a building panel.

FIG. 2 shows a method to produce a building panel 10. The building panel 10 may be a floor panel, a wall panel, a ceiling panel, a furniture component, etc. A substrate 2 is arranged on a conveyor belt 12. In the embodiment shown in FIG. 2, the substrate 2 comprises a core 4 and a decorative layer 3 arranged on the core 4. The core 4 comprises preferably a thermoplastic material, for example PVC. The core 4 may be a WPC (Wood Plastic Composite) or a polymer core comprising fillers and a thermoplastic material. The core may be extruded or calendered. Alternatively, the core 4 may be a wood-based board such as MDF or HDF or a mineral board. The decorative layer 3 may comprise a thermoplastic material such as thermoplastic foil, for example, a PVC foil. The decorative layer 3 may be coloured or provided with a decorative pattern 7 such as a printed design. The decorative layer 3 may be a wood veneer layer, a cork layer or a decorative paper.

In alternative embodiments, the core 4 of the above described type may be provided with a printed design printed on the core 4. No decorative layer is arranged on the core 4 in this embodiment. In one embodiment, the wear resistant layer 1 of the type described above with reference to FIG. 1 is pigmented, and/or is printed such that a printed wear resistant layer is formed. In one embodiment without a decorative layer, the core 4 may be used without a printed design and, optionally, the wear resistant layer may be substantially transparent. When no separate decorative layer is provided, the wear resistant layer 1 may be arranged directly on the core 4.

In the embodiment shown in FIG. 2, the wear resistant layer 1 of the type described above with reference to FIG. 1 is applied on the decorative layer 3. The wear resistant layer 1 comprises a thermoplastic material. The wear resistant layer 1 may further comprise wear resistant particles and/or scratch resistant particles, for example, aluminium oxide such as corundum or silica.

By scratch resistant particles are meant particles improving the scratch or scratch resistant properties. The scratch resistant particles may be or comprise nano-sized silica particles, preferably fused silica particles. The scratch resistant particles may be or comprise aluminium oxide. The scratch resistant particles may be disc shaped particles, preferably having a width/thickness ratio being equal or exceeding 3:1, more preferably being equal or exceeding 5:1. Such disc-shaped particles orientate along the surface of the layer, thereby improving the scratch resistance of the wear resistant layer. The scratch resistant particles may have an average particle diameter of 1-50 μm, preferably 10-20 μm.

The wear resistant particles may be aluminium oxide particles such as corundum. Alternatively, or as a complement, the wear resistant particles may be carborundum, quartz, silica, glass, glass beads, glass spheres, silicon carbide, diamond particles, hard plastics, reinforced polymers and organics. The wear resistant particles preferably have an average particle diameter of 10-200 μm, preferably 50-100 μm, more preferably 25-100 μm. The wear resistant particles may have an average particle diameter of less than 200 μm, preferably less than 100 μm, and more preferably less than 75 μm such that less than 45 μm. The wear resistant particles may have an irregular shape. The wear resistant particles 4 may be surface treated. The wear resistant particles 4 may be silane-treated particles.

The refractive index of the wear resistant particles may be 1.4-1.7. In one embodiment, the wear resistant particle may have a refractive index of 1.4-1.9, preferably 1.5-1.8, for example, 1.7-1.8. Preferably, the refractive index of the wear resistant particles does not differ from the refractive index of the wear resistant layer 1 more than ±20%.

Preferably, both the wear resistant particles and/or the scratch resistant particles do not protrude outside the surface of the wear resistant layer. Preferably, the wear resistant particles and/or the scratch resistant particles are substantially encapsulated in the wear resistant layer. Preferably, more than 90% of the surface area of the wear and/or scratch resistant particles are encapsulated in the wear resistant layer. Preferably, the wear and/or scratch resistant particles do no protrude outside the surface of the wear resistant layer. For example, preferably at least 95% of the particles are substantially encapsulated; optionally at least 99% of the particles.

The wear resistant layer 1 may be substantially transparent, or at least substantially transparent after pressing.

The thermoplastic material of the wear resistant layer may comprise polyurethane (PU), polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof. The thermoplastic material may comprise thermoplastic polyurethane (PU) such as such as thermoplastic aromatic or aliphatic polyurethane, or mixture thereof. The thermoplastic material may comprise an ionomer, for example of polyethylene. The thermoplastic material may be a casting resin or hot melt. Also the core and/or the decorative layer may comprise the thermoplastic materials listed above.

Preferably, the wear resistant layer 1 is formed of the thermoplastic material. The wear resistant layer 1 may substantially consist of the thermoplastic material, optionally wear and/or scratch resistant particles and optionally additives. Additives may be plasticizers, stabilizers, lubricants, degassing agents, coupling agents, compatibilizers, crosslinking agents, etc.

In one embodiment, the wear resistant layer 1 is a thermoplastic wear resistant foil. The foil may be thermoplastic PU foil such as thermoplastic aromatic or aliphatic polyurethane foil, PVC foil, or a foil of any other thermoplastic material mentioned above.

The above described wear resistant particles and/or scratch resistant particles, for example aluminium oxide such as corundum or silica, may be included in the wear resistant foil, for example included in the extrusion process. In one embodiment, wear and/or resistant particles are arranged between a first and a second thermoplastic foil. The first and the second thermoplastic foil may comprise different thermoplastic material. The first foil may comprise PVC. The second foil may comprise thermoplastic PU. The second foil is adapted to face upwards, away from the substrate. The second foil is adapted to contact a pressing device in a pressing step.

In another embodiment, the wear resistant layer 1 is applied as a powder layer. A thermoplastic powder comprising for example PVC is applied on the decorative layer 3. The above described wear and/or scratch resistant particles may be mixed with the thermoplastic powder, or applied on top of the thermoplastic powder. Alternatively, the wear resistant layer is applied as a powder layer comprising a UV curable powder, for example comprising acrylate or methacrylate monomers or oligomers. The thermoplastic parts of the UV curable powder, for example such as thermoplastic PU backbone, acts like a thermoplastic during pressing, while UV curable parts are cured by UV light after pressing.

In another embodiment, the wear resistant layer 1 is applied as a coating on the decorative layer 3. The coating may be a drying coating, a curable coating, or a hot melt coating. The coating may be a radiation curable coating, preferably a UV curable coating. The coating may comprise acrylate or methacrylate monomers or oligomers. The above described wear and/or scratch resistant particles may be applied to the coating. When using a curing coating, prior to pressing, the coating may be cured such that the wear resistant layer 1 is formed. If another type of is used coating, the coating may be dried or cooled prior to pressing.

The wear resistant layer 1 may be formed by any of the methods disclosed in SE2015/050782 or in SE2015/050783, the entire contents of each is expressly incorporated by reference herein.

The core 4 having the decorative layer 3 and the wear resistant layer 1 arranged thereon is conveyed into a pressing device 11. The pressing device 11 may be static or continuous.

A top surface of the wear resistant layer 1 is pressed against the pressing device 11 having different gloss levels. A press surface of the pressing device may have portions having high gloss, or even super high gloss levels and portions being matt. The different gloss levels are provided with micro embossings or a micros structure having a maximum depth of 30 μm. The higher depth of the micro structure, the more the portion or portions having a matt texture. The lower depth of the micro structure, the more glossy portion or portions. When pressing the top surface of the wear resistant layer 1 against the micro structure, the top surface of the wear resistant layer 1 obtains portions having different gloss levels. The depth of the micro embossing may vary over the surface of the pressing device 11 such that a varying gloss levels are obtained. When pressing the top surface of the wear resistant layer 1 against the micro structure, the top surface of the wear resistant layer 1 obtains portions having different gloss levels, corresponding to the gloss levels of the press surface of the pressing device. The gloss levels may be varying over the top surface of the wear resistant layer 1. By different gloss levels is preferably meant that the gloss level of a first portion, or a first set of portions, differs from the gloss level of a second portion, or a second set of portions. The first portion, or the first set of portions, may have a higher gloss level than the second portion, or the second set of portions. The first portion, or first set of portions, may have a first degree of gloss, and the second portion, or second set of portions, may have a second degree of gloss, being higher or lower than first degree of gloss.

The pressing device 11 may also be provided with protrusions for forming macro embossings or a macro structure of the top surface of the wear resistant layer 1. The macro structure may also be in register with the decorative print or printed design 7 of the decorative layer 3.

The pressing device 11 may comprise a metal surface provided with the different gloss levels. The metal surface of the pressing device 11 is adapted to directly contact the wear resistant layer. The pressing device 11 may be a pressing cylinder or pressing plate provided with the different gloss levels, wherein the pressing cylinder or pressing plate directly contacts the wear resistant layer.

In one embodiment, the pressing device 11 may comprise a structure foil provided with different gloss levels. The structure foil is adapted to directly contact the wear resistant layer 1. The structure foil may be arranged between the wear resistant layer 1 and a press plate, press belt or press cylinder during pressing.

The wear resistant layer 1 is pressed against the pressing device 11. Preferably, heat is also applied. The pressing device 11 may be a static press or a continuous press. The top surface of the wear resistant layer 1 may be provided with a release agent in order to avoid that the wear resistant layer 1 sticks to the pressing device 11. Since no additional layer is to be applied on the wear resistant layer 1, a release agent can be applied on the wear resistant layer 1, thereby facilitating the pressing operation.

The wear resistant layer 1 having portions with different gloss levels may be substantially transparent after pressing. The different gloss levels are formed by a micro structure in the surface, preferably having a maximum depth of 30 μm.

The different gloss levels may be formed in register with the decorative pattern or printed design 7 of the decorative layer 3.

The thickness of the wear resistant layer 1 after pressing may be 0.01-1 mm such as 0.01-0.1 mm. Preferably, the wear resistant layer 1 has a thickness of less than 0.5 mm after pressing.

The top surface of the wear resistant 1 layer may also be provided with embossed portions during pressing. The pressing device 11 such as the press plate, the press cylinder, the press belt or structure foil may be provided with protrusions forming embossing or macro structure in the wear resistant layer 1. Alternatively, the embossed portions may be formed in a separate step from forming the portions having different gloss levels. The embossing is preferably in register with the decorative pattern or printed design 7. The embossing is preferably coordinated with the portions having different gloss levels of the wear resistant layer 1. The embossed portions in the wear resistant layer, preferably have a depth exceeding 100 μm.

If the wear resistant layer 1 is applied as a foil, the portions having different gloss levels are formed in the foil.

If the wear resistant layer 1 is applied as a powder layer, the wear resistant layer 1 is formed during pressing by the powder being transferred into a layer when applying pressure, and preferably also heat.

If the wear resistant layer 1 is applied as a coating, a pre-processing step may be performed prior to pressing. The pre-processing step may be drying, cooling and/or gelling. If a radiation curing coating is used, the coating is gelled prior to pressing. During pressing, the portions having different gloss levels are formed in the gelled coating.

In one embodiment, the coating may be a combination of thermosetting and thermoplastic binder. The thermoplastic part of the binder may be activated in a pre-heating and/or pressing operation for forming the wear resistant layer 1. In the pressing step, wherein the wear resistant layer is pressed against the pressing device 11 having portions with different gloss levels, the thermosetting part of the binder may be activated, such that the binder is cured and reaches its final state. The wear resistant layer 1 is thereby formed having portions with different gloss levels.

By pressing by the pressing device 11, the wear resistant layer 1, the core 4 and the optional decorative layer 3 are adhered to each other such that a building panel is formed 10.

In FIG. 3A, the building panel 10 is shown in more detail. The building panel 10 comprises a core 4 of the above described type, a decorative layer 3 of the above described type arranged on the core 4, and a wear resistant layer 1 of the above described type arranged on the decorative layer 3. The wear resistant layer 1 may be produced according to the method described with reference to FIG. 1, and adhered to the decorative layer 3 arranged on the core 4 in a subsequent step. Alternatively, the wear resistant layer 1 may be produced according to the method described with reference to FIG. 2, wherein the wear resistant layer 1, the decorative layer 3 and the core 4 are adhered to each other during pressing.

The wear resistant layer 1 may include scratch resistant particles and/or wear resistant particles as described above with reference to FIG. 1 and FIG. 2. The wear resistant particles and/or the scratch resistant particles are substantially encapsulated in the wear resistant layer 1.

The building panel 10 is provided with portions having different gloss levels 5, 6. The portions 5, 6 having different gloss are preferably arranged in register with the decorative pattern or printed design 7 of the decorative layer 3. The wear resistant layer 1 may also be provided with an embossing, wherein the embossing or macro structure is in register with the decorative pattern or printed design 7 of the decorative layer 3, and coordinated with the portions 5, 6 having different gloss levels of the wear resistant layer 1. The wear resistant layer 1 may be at least substantially transparent.

The gloss levels may be varying over the top surface of the wear resistant layer 1. By different gloss levels is preferably meant that the gloss level of a first portion 5, or a first set of portions 5, differs from the gloss level of a second portion 6, or a second set of portions 6. The first portion 5, or the first set of portions 5, may have a higher gloss level than the second portion 6, or the second set of portions 6. The first portion 5, or first set of portions 5, may have a first degree of gloss, and the second portion 6, or second set of portions 6, may have a second degree of gloss, being higher or lower than first degree of gloss.

In the embodiment shown in FIG. 3A, the first set of portions 5, having a higher gloss level than the second set of portions 6, are in register with protruding portions of the building panel 10. The second set of portions 6, having a lower gloss level than the first set of portions 5, is in register with embossed portions of the building panel 10. Depending on design, the opposite combination of gloss level and embossing is also possible.

The building panel 10 shown in FIG. 3A may be a floor panel, a ceiling panel, a wall panel, a furniture component, etc. The building panel 10 may be provided with a mechanical locking system (not shown) at its edges for locking to an adjacent building panel. The mechanical locking system may comprise at a first edge of the building panel a tongue groove adapted to receive a tongue of an adjacent building panel, and a locking strip provided with a locking element adapted to cooperate with a locking groove of an adjacent building panel and lock the building panel in a horizontal direction to the adjacent building panel. The mechanical locking system may further comprise at a second edge a locking groove adapted to receive a locking element of an adjacent building panel, and a tongue adapted cooperate with a tongue groove of an adjacent building panel and lock the building panel in a vertical direction. The mechanical locking system is formed in the core of the building panel. Both long side edges and short side edges of the building panel may be provided with a mechanical locking system. Alternatively, long side edges of the building panel may be provided with the mechanical locking system for horizontally and vertically locking, and the short side edges may be provided with a mechanical locking system for horizontally locking only. The mechanical locking system may be of the type described in WO 2007/015669, WO 2008/004960, WO 2009/116926, or WO 2010/087752, the entire contents of each are hereby expressly incorporated by reference herein.

Figure 3B:
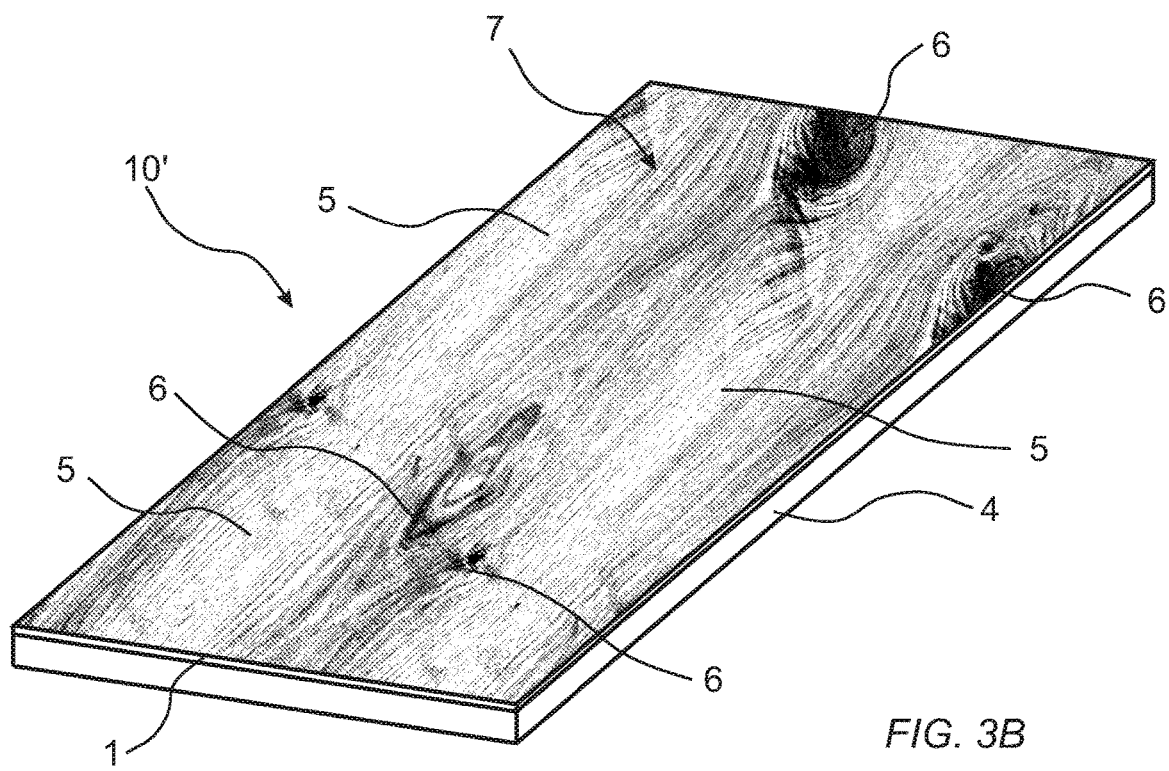

A second embodiment of a building panel 10' is shown in FIG. 3B. The building panel 10' comprises a core 4 of the above described type and a wear resistant layer 1 of the above described type arranged on the core 4. The wear resistant layer 1 may be produced according to the method described with reference to FIG. 1, and adhered to the core 4 in a subsequent step. Alternatively, the wear resistant layer 1 may be produced according to the method described with reference to FIG. 2, wherein the wear resistant layer 1 and the core 4 may be adhered to each other during pressing, or adhered to each other by an adhesive in a subsequent step.

An upper surface of the core 4 or a lower surface of the wear resistant layer 1, opposite the surface of the wear resistant layer 1 having portions with different gloss 5, 6, may be provided with a decorative pattern or printed design 7.

The wear resistant layer 1 may include scratch resistant particles and/or wear resistant particles as described above with reference to FIG. 1 and FIG. 2. The wear resistant particles and/or the scratch resistant particles are substantially encapsulated in the wear resistant layer 1.

The building panel 10' is provided with portions 5, 6 having different gloss levels. The portions 5, 6 having different gloss are preferably arranged in register with the decorative pattern or printed design 7 provided on the wear resistant layer 1 or on the core 4. The wear resistant layer 1 may also be provided with an embossing, wherein the embossing is in register with the decorative pattern or printed design 7, and coordinated with the portions 5, 6 having different gloss levels of the wear resistant layer 1. The wear resistant layer 1 may be at least substantially transparent.

The gloss levels may be varying over the top surface of the wear resistant layer 1. By different gloss levels is preferably meant that the gloss level of a first portion 5, or a first set of portions 5, differs from the gloss level of a second portion 6, or a second set of portions 6. The first portion 5, or the first set of portions 5, may have a higher gloss level than the second portion 6, or the second set of portions 6. The first portion 5, or first set of portions 5, may have a first degree of gloss, and the second portion 6, or second set of portions 6, may have a second degree of gloss, being higher or lower than first degree of gloss.

In the embodiment shown in FIG. 3B, the first set of portions 5, having a higher gloss level than the second set of portions 6, are in register with protruding portions of the building panel 10'. The second set of portions 6, having a lower gloss level than the first set of portions 5, are in register with embossed portions of the building panel 10'. Depending on design, the opposite combination of gloss level and embossing is also possible.

The building panel 10' shown in FIG. 3B may be a floor panel, a ceiling panel, a wall panel, a furniture component, etc. The building panel 10' may be provided with a mechanical locking system of the type described above with reference to FIG. 3A at its edges for locking to an adjacent building panel.

Figure 3C:
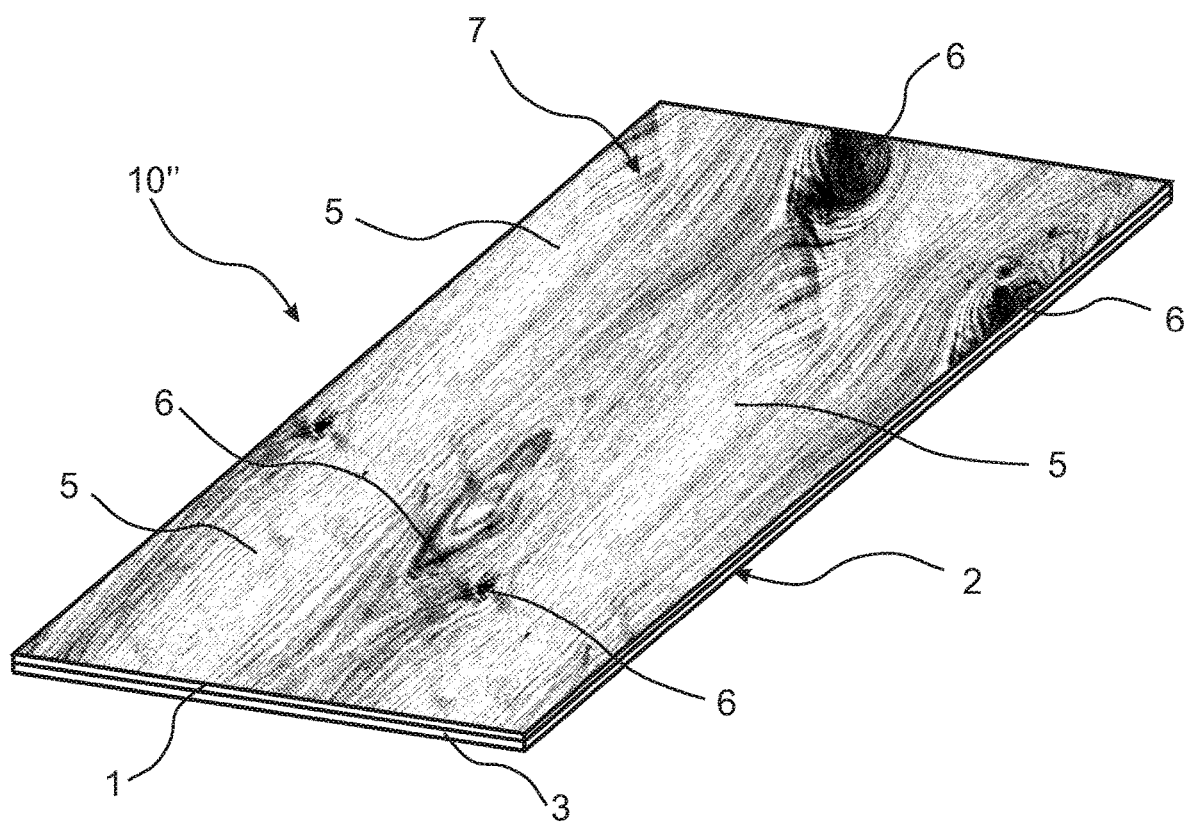

A third embodiment of a building panel 10" is shown in FIG. 3C. The building panel 10" comprises a substrate 2. In the embodiment in FIG. 3C, the substrate 2 comprises a decorative layer 3, and a wear resistant layer 1 arranged on the decorative layer 3. The decorative layer 3 is of the type described above with reference to FIG. 2. The wear resistant layer 1 is of the type described above with reference to FIGS. 1 and 2. The wear resistant layer 1 may be produced according to the method described with reference to FIG. 1, and adhered to the decorative layer 3 in a subsequent step. Alternatively, the wear resistant layer 1 may be produced according to the method described with reference to FIG. 2, wherein the wear resistant layer 1 and the decorative layer 3 are then adhered to each other during pressing.

The wear resistant layer 1 may include scratch resistant particles and/or wear resistant particles as described above with reference to FIG. 1 and FIG. 2. The wear resistant particles and/or the scratch resistant particles are substantially encapsulated in the wear resistant layer 1.

The wear resistant layer 1 is provided with portions 5, 6 having different gloss levels. The portions 5, 6 having different gloss are preferably arranged in register with the decorative pattern or printed design 7 of the decorative layer 3. The wear resistant layer 1 may also be provided with an embossing, wherein the embossing is in register with the decorative pattern or printed design 7 of the decorative layer 3, and coordinated with the portions 5, 6 having different gloss levels of the wear resistant layer 1. The wear resistant layer 1 may be at least substantially transparent.

The gloss levels may be varying over the top surface of the wear resistant layer 1. By different gloss levels is preferably meant that the gloss level of a first portion 5, or a first set of portions 5, differs from the gloss level of a second portion 6, or a second set of portions 6. The first portion 5, or the first set of portions 5, may have a higher gloss level than the second portion 6, or the second set of portions 6. The first portion 5, or first set of portions 5, may have a first degree of gloss, and the second portion 6, or second set of portions 6, may have a second degree of gloss, being higher or lower than first degree of gloss.

In the embodiment shown in FIG. 3C, the first set of portions 5, having a higher gloss level than the second set of portions 6, are in register with protruding portions of the building panel 10". The second set of portions 6, having a lower gloss level than the first set of portions 5, are in register with embossed portions of the building panel 10". Depending on design, the opposite combination of gloss level and embossing is also possible.

The building panel 10" shown in FIG. 3C may form part of a floor panel, a ceiling panel, a wall panel, a furniture component, etc. The decorative layer 3 and the wear resistant layer 1 may be adhered to a core 4 of the above described type in a subsequent step. The building panel may be provided with a mechanical locking system of the type described above with reference to FIG. 3A at its edges for locking to an adjacent building panel.

It is also contemplated that a conventional wear resistant foil is arranged on the substrate, for example on the decorative layer, and that a wear resistant layer according to embodiments of the present invention, for example, in form of a coating, is applied on the conventional wear resistant foil, wherein the wear resistant layer is provided with portions having different gloss levels during pressing. It is also contemplated that the conventional wear resistant foil may be provided with embossings, preferably in register with the decorative pattern or printed design of the decorative layer, while the wear resistant layer according to embodiments of the present invention is provided portions having different gloss levels, preferably in register with the decorative pattern or printed design and coordinated with the embossings of the conventional wear resistant foil. The conventional wear resistant foil may be pressed against a pressing device comprising protrusion for forming embossed portions prior to applying the wear resistant layer according to embodiments of the present invention, for example, in form of a coating.

A coating applied according to the wear resistant layer according to embodiments of the invention is not excluded. The coating may be a radiation curing coating such as a UV curing coating. For example, protrusions of the wear layer may be coated such that a different gloss level is formed.

The portions of the pressing device having different gloss levels as described above may be formed in several ways. For example, the portions having different gloss of the pressing device such as the press plate, press belt or pressing cylinder may be obtained by engraving, abrasive blasting, etching, polishing such as electropolishing etc. The different gloss levels may also be obtained by digital printing a substance on the surface of the pressing device. The digital print may be in register with a decorative pattern of the building panel.

It is contemplated that the wear resistant layer according to all aspects of the invention may be polished after pressing such that an even higher degree of gloss is obtained.

It is further contemplated that the wear resistant layer as described above according to all aspects of the invention is pigmented such that a colour wear resistant layer is provided. Further, the wear resistant layer of the type described above may be printed such that a printed wear resistant layer is provided.

It is contemplated that the different gloss levels may be obtained by polishing and/or blasting as alternatives to pressing against a pressing device having different gloss levels. It is contemplated that in all described embodiments, the top surface of the wear resistant layer may be pressed against a pressing device. The press surface of the pressing device may have a substantially uniform gloss level. In one embodiment, the pressing device has an embossed press surface. A wear resistant layer of the above described type is provided and the top surface of the wear resistant layer is pressed against the embossed pressing device such as an embossed press plate, embossed pressing cylinder or embossed press belt such that an embossed structure in the top surface of the wear resistant layer are formed. The top surface of the wear resistant layer is thereafter polished such that any protruding portions in the top surface of the wear resistant layer obtains a different degree of gloss compared to portions not being polished. In one embodiment, the top surface of the wear resistant layer is polished such that any protruding portions in the top surface of the wear resistant layer obtains a higher gloss level compared to the gloss level of embossed portions in the top surface of the wear resistant layer. Alternatively, or combined, the top surface of the wear resistant layer is polished such that any protruding portions in the top surface of the wear resistant layer obtains a lower gloss level compared to the gloss level of embossed portions in the top surface of the wear resistant layer. Thereby, a top layer of the wear resistant layer having different gloss level is formed. As described above with references to FIGS. 1 and 2, the wear resistant layer may be formed as a separate layer, as described with reference to FIG. 1, or when forming the building panel, as described with reference to FIG. 2. When polishing, a polish may be used, for example, comprising abrasive particles. By using different types of polish, a lower or higher gloss level may be obtained.

Instead of using a pressing device having an embossed press surface, the top surface of the wear resistant layer of the above described type may be pressed against a pressing device having a plane press surface. The press surface of the pressing device may have a substantially uniform gloss level. After pressing, portions of the top surface of the wear resistant layer may be masked, and the non-masked portions are polished such that the non-masked portions obtains a gloss level being different from the gloss level of the masked portions. Alternatively, or as a complement, portions of the top surface of the wear resistant layer may be blasted, such that the portions obtains a gloss level being different from the gloss level of the rest of the top surface of the wear resistant layer.

It is contemplated that there are numerous modifications of the embodiments described herein, which are still within the scope of the invention as defined by the appended claims. For example, it is contemplated that more than one wear resistant layer may be arranged on a core for forming a building panel.

It is also contemplated that even if the layer described above as a wear resistant layer may be a decorative layer, or any kind of layer.

Example 1

A thermoplastic aliphatic PU foil having a thickness of 0.05 mm forming a wear resistant layer was applied on a decorative layer comprising PVC. The decorative layer was affixed to a thermoplastic core comprising PVC. The wear resistant layer, the decorative layer and the core were pressed together for forming a building panel, the layers being adhered to each other. The wear resistant was pressed against a structure foil of paper. The structure foil included two different gloss levels. By pressing the structure foil having two different gloss levels against the wear resistant layer, the thermoplastic wear resistant layer obtains two different gloss levels. One portion on the top surface of the wear resistant layer was measured with a glossmeter to have a gloss of 39.2 GU, another portion to have a gloss of 12.7 GU.

Example 2

A thermoplastic aliphatic PU foil having a thickness of 0.05 mm forming a wear resistant layer was applied on a decorative layer comprising PVC. The decorative layer was affixed to a thermoplastic core comprising PVC. The wear resistant layer, the decorative layer and the core were pressed together for forming a building panel, the layers being adhered to each other. The wear resistant was pressed against a press plate. The press plate included a metal press surface. The press plate included two different gloss levels. By pressing the press plate having two different gloss levels against the wear resistant layer, the thermoplastic wear resistant layer obtains two different gloss levels. One portion on the top surface of the wear resistant layer was measured with a glossmeter to have a gloss 19.1 GU, another portion to have a gloss of 1.8 GU.

Example 3

A wear resistant layer, in form of a multilayer foil comprising a PVC foil and a thermoplastic aliphatic PU foil with wear resistant particles in form of aluminium oxide particles there between, was applied on a decorative layer comprising PVC, the PVC foil facing the decorative layer. The decorative layer was affixed to a thermoplastic core comprising PVC. The wear resistant layer, the decorative layer and the core were pressed together to form a building panel, the layers being adhered to each other. The wear resistant layer was pressed against a structure foil of paper. The structure foil included two different gloss levels. By pressing the structure foil having two different gloss levels against the wear resistant layer, the thermoplastic wear resistant layer obtains two different gloss levels. One portion on the top surface of the wear resistant layer was measured with a glossmeter to have a gloss 25.2 GU, another portion to have a gloss of 12.6 GU.

Example 4

A wear resistant layer, in form of a multilayer foil comprising a PVC foil and a thermoplastic aliphatic PU foil with wear resistant particles in form of aluminium oxide particles there between, was applied on a decorative layer comprising PVC, the PVC foil facing the decorative layer.

The decorative layer was affixed to a thermoplastic core comprising PVC. The wear resistant layer, the decorative layer and the core were pressed together to form a building panel, the layers being adhered to each other. The wear resistant layer was pressed against a press plate. The press plate included a metal press surface. The press plate included two different gloss levels. By pressing the press plate having two different gloss levels against the wear resistant layer, the thermoplastic wear resistant layer obtains two different gloss levels. One portion on the top surface of the wear resistant layer was measured with a glossmeter to have a gloss 20.0 GU, another portion to have a gloss of 3.8 GU.

Comparative Example 5

A commercially available LVT product comprising a surface lacquer was subjected to polishing with an abrading product resulting in a worn product losing the protective function of the lacquered layer.

Example 6

A wear resistant layer, in form of a multilayer foil comprising a PVC foil and a thermoplastic aliphatic PU foil with wear resistant particles in form of aluminium oxide particles there between, was applied on a decorative layer comprising PVC, the PVC foil facing the decorative layer. The decorative layer was affixed to a thermoplastic core comprising PVC. The wear resistant layer, the decorative layer and the core were pressed together for forming a building panel, the layers being adhered to each other. The wear resistant was pressed against a press plate. The press plate included a metal press surface. By polishing portions of the thermoplastic wear resistant layer with abrading products the product obtains two different gloss levels without destroying the protective function of the wear layer. One portion on the top surface of the wear resistant layer was measured with a glossmeter to have a gloss 21.1 GU, another portion to have a gloss of 3.8 GU.

The invention claimed is:

1. A method to produce a building panel comprising a thermoplastic material having a microstructured top surface, the microstructured top surface having different gloss levels, the method comprising:
   applying a decorative layer onto a core,
   applying the thermoplastic material directly onto the decorative layer, wherein the thermoplastic material comprises wear resistant particles substantially encapsulated into the thermoplastic material, the thermoplastic material optionally further including scratch resistant particles and/or additives,
   pressing a top surface of the thermoplastic material, which has the encapsulated wear resistant particles, against a pressing device having portions with different gloss levels, such that the top surface of the thermoplastic material directly attached to the decorative layer obtains a microstructure with portions having different gloss levels, the thermoplastic material being substantially transparent,
   wherein the microstructure in the top surface of the thermoplastic material has a maximum depth of 30 µm,
   further comprising forming embossed portions in the top surface of the thermoplastic material, the embossed portions each having a depth exceeding 100 µm.

2. The method according to claim 1, wherein the thermoplastic material further comprises scratch resistant particles.

3. The method according to claim 2, wherein the scratch resistant particles are substantially encapsulated in the thermoplastic material.

4. The method according to claim 2, wherein the scratch resistant particles have an average particle diameter of less than 200 µm.

5. The method according to claim 1, wherein the thermoplastic material comprises thermoplastic polyurethane.

6. The method according to claim 1, wherein the thermoplastic material comprises polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof.

7. The method according to claim 1, wherein the pressing device comprises a metal surface, wherein said portions with different gloss levels are provided in said metal surface.

8. The method according to claim 1, wherein the pressing device is one of a pressing cylinder, a press belt, and a press plate, wherein the pressing cylinder, press belt or press plate has portions with different gloss levels.

9. The method according to claim 1, wherein the pressing device comprises a structure foil, wherein the structure foil has portions with different gloss levels.

10. The method according to claim 1, further comprising applying the thermoplastic material on a substrate prior to pressing.

11. The method according to claim 10, wherein the substrate comprises a thermoplastic material.

12. A method to produce a building panel, the method comprising:
   providing a substrate,
   applying a decorative layer onto the substrate,
   applying only a single thermoplastic layer, wherein the single thermoplastic layer is applied directly onto the decorative layer, wherein the single thermoplastic layer consists essentially of a thermoplastic material, wear resistant particles substantially encapsulated into the thermoplastic material, and optionally scratch resistant particles and/or additives, and
   pressing the substrate, decorative layer, and the single thermoplastic layer together, thereby forming a building panel,
   wherein a top surface of the single thermoplastic layer directly attached to the decorative layer, which has the encapsulated wear resistant particles, is directly pressed against a pressing device having portions with different gloss levels, such that the top surface of the single thermoplastic layer obtains portions having different gloss levels after pressing, the single thermoplastic layer being substantially transparent
   wherein the pressing device is one of a pressing cylinder, a pressing belt, and a press plate,
   further comprising forming embossed portions in the top surface of the single thermoplastic layer, the embossed portions in the top surface of the single thermoplastic layer each having a depth exceeding 100 µm.

13. The method according to claim 12, wherein the single thermoplastic layer comprises scratch resistant particles.

14. The method according to claim 13, wherein the scratch resistant particles are substantially encapsulated in the thermoplastic material.

15. The method according to claim 13, wherein the scratch resistant particles have an average particle diameter of less than 200 µm.

16. The method according to claim 12, wherein the portions having different gloss levels are in register with a decorative pattern or printed design.

17. The method according to claim 12, wherein the thermoplastic material comprises thermoplastic polyurethane (PU).

18. The method according to claim 12, wherein the thermoplastic material comprises polyvinyl chloride (PVC), polyethylene terephthalate (PET), polyvinyl butyral (PVB), polybutylene terephthalate (PBT), cross-linked polyethylene (PEX), polyethylene (PE), polyester, polystyrene (PS), polypropylene (PP), polycarbonate (PC), polyvinyl acetate (PVAc), ethylene-vinyl acetate (EVA), polyacrylate, methacrylate, and/or a combination thereof.

19. The method according to claim 12, wherein the pressing device comprises a metal surface, wherein said portions with different gloss levels are provided in said metal surface.

20. The method according to claim 12, wherein the different gloss levels are in a micro structure in the top surface of the single thermoplastic layer, the microstructure including portions having a maximum depth of 30 μm after the pressing.

21. The method according to claim 12, wherein the substrate comprises a thermoplastic material.

22. The method according to claim 12, wherein the decorative layer comprises a printed design.

23. The method according to claim 1, wherein the pressing device is one of a pressing cylinder, a pressing belt, and a press plate.

24. The method according to claim 1, wherein
the pressing device comprises micro embossings that each possesses a depth,
the depth of each of the micro embossings being less than 30 μm, and
the depths of the micro embossings varies over a surface of the pressing device so that the microstructure is formed by the pressing.

25. The method according to claim 1, wherein the portions of the different gloss levels of the pressing device are provided by digitally printing a substance on a surface of the pressing device.

26. The method according to claim 1, wherein
the portions in the top surface of the thermoplastic material having different gloss levels after pressing include at least a first portion and a second portion,
the first portion and the second portion each having micro embossings,
the micro embossings of the first portion being of a greater depth than the micro embossings of the second portion so that the first portion has a lower degree of gloss than the second portion.

27. The method according to claim 1, wherein the pressing device directly contacts an entirety of the top surface of the thermoplastic material to form the portions having the different gloss levels in the top surface after the pressing.

28. The method according to claim 1, wherein the wear resistant particles are applied in an amount of 20-100 g/m$^2$.

29. The method according to claim 1, wherein the wear resistant particles have an average particle diameter of less than 200 μm.

30. The method according to claim 12, wherein the wear resistant particles have an average particle diameter of less than 200 μm.

* * * * *